US012598469B2

(12) United States Patent　　　　(10) Patent No.: US 12,598,469 B2
Paczkowski et al.　　　　　　　　　(45) Date of Patent: Apr. 7, 2026

(54) DYNAMIC IDENTIFICATION GENERATION FOR TELECOMMUNICATIONS NETWORK USER EQUIPMENT

(71) Applicant: T-MOBILE INNOVATIONS LLC, Overland Park, KS (US)

(72) Inventors: Lyle Walter Paczkowski, Mission Hills, KS (US); Marouane Balmakhtar, Fairfax, VA (US); Galip Murat Karabulut, Vienna, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 529 days.

(21) Appl. No.: 18/147,605

(22) Filed: Dec. 28, 2022

(65) Prior Publication Data

US 2024/0224051 A1　　Jul. 4, 2024

(51) Int. Cl.
　　*H04W 12/71*　　　(2021.01)
　　*H04W 12/06*　　　(2021.01)
　　*H04W 12/08*　　　(2021.01)
　　*H04W 60/00*　　　(2009.01)

(52) U.S. Cl.
　　CPC ........... *H04W 12/71* (2021.01); *H04W 12/06* (2013.01); *H04W 12/08* (2013.01); *H04W 60/00* (2013.01)

(58) Field of Classification Search
　　CPC ..... H04W 12/71; H04W 12/06; H04W 12/08; H04W 60/00
　　See application file for complete search history.

(56) References Cited

U.S. PATENT DOCUMENTS

| | | | | |
|---|---|---|---|---|
| 10,742,421 | B1 * | 8/2020 | Wentz | H04L 9/0897 |
| 2003/0166398 | A1 * | 9/2003 | Netanel | H04W 12/08 |
| | | | | 455/410 |
| 2020/0296581 | A1 * | 9/2020 | Loreskar | H04W 12/48 |
| 2021/0360408 | A1 * | 11/2021 | Shaw | H04W 24/08 |
| 2022/0158855 | A1 * | 5/2022 | Wentz | H04L 9/3247 |
| 2023/0396455 | A1 * | 12/2023 | Wane | H04L 9/50 |
| 2024/0073697 | A1 * | 2/2024 | Singh | H04W 12/06 |

OTHER PUBLICATIONS

Cao et al., "A Survey on Security Aspects for 3GPP 5G Networks" IEEE (Year: 2020).*
Gu et al., "OS-SOMMELIER: Memory-Only Operating System Fingerprinting in the Cloud" SOCC '12 ACM (Year: 2012).*
Unknown, "Device Fingerprint," Wikipedia, last edited Nov. 11, 2022 at 16:20 UTC, pp. 1-9.
Unknown, "TCP/IP stack fingerprinting," Wikipedia, last edited Feb. 27, 2022 at 14:06 UTC, pp. 1-2.

* cited by examiner

*Primary Examiner* — Jinsong Hu
*Assistant Examiner* — Justin Barry
(74) *Attorney, Agent, or Firm* — Shook, Hardy & Bacon L.L.P.

(57) ABSTRACT

Systems and methods for dynamic identification generation for telecommunications network user equipment (UE) are provided. Embodiments of the present disclosure, generate a device identifier (ID) for UE that access services provided by a network. In some of the embodiments described herein, instrumentation instances are executed which may take measurements of UE memory states for use as measurement fingerprints. Measurement fingerprints may be combined with pre-provisioned elements to generate a device ID. A UE may generate measurement fingerprints based on measurements of device memory states corresponding to a pre-defined set of one or more tasks executed by the UE; generate a registration ID for the UE based on pre-provisioned elements associated with the UE; generate the device ID as a function of the set of measurement fingerprints and the registration ID; and transmit a message comprising the device ID to a network function of a network.

20 Claims, 11 Drawing Sheets

110

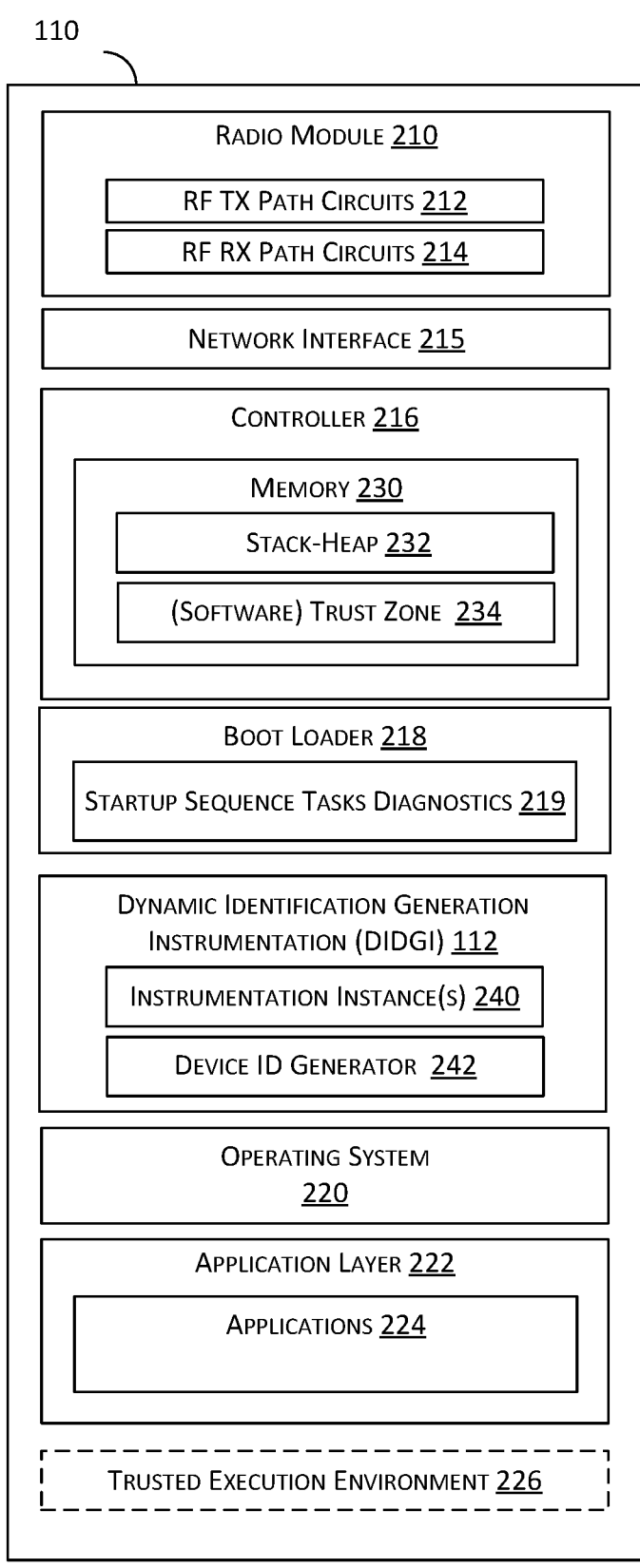

RADIO MODULE 210

RF TX PATH CIRCUITS 212

RF RX PATH CIRCUITS 214

NETWORK INTERFACE 215

CONTROLLER 216

MEMORY 230

STACK-HEAP 232

(SOFTWARE) TRUST ZONE 234

BOOT LOADER 218

STARTUP SEQUENCE TASKS DIAGNOSTICS 219

DYNAMIC IDENTIFICATION GENERATION INSTRUMENTATION (DIDGI) 112

INSTRUMENTATION INSTANCE(S) 240

DEVICE ID GENERATOR 242

OPERATING SYSTEM 220

APPLICATION LAYER 222

APPLICATIONS 224

TRUSTED EXECUTION ENVIRONMENT 226

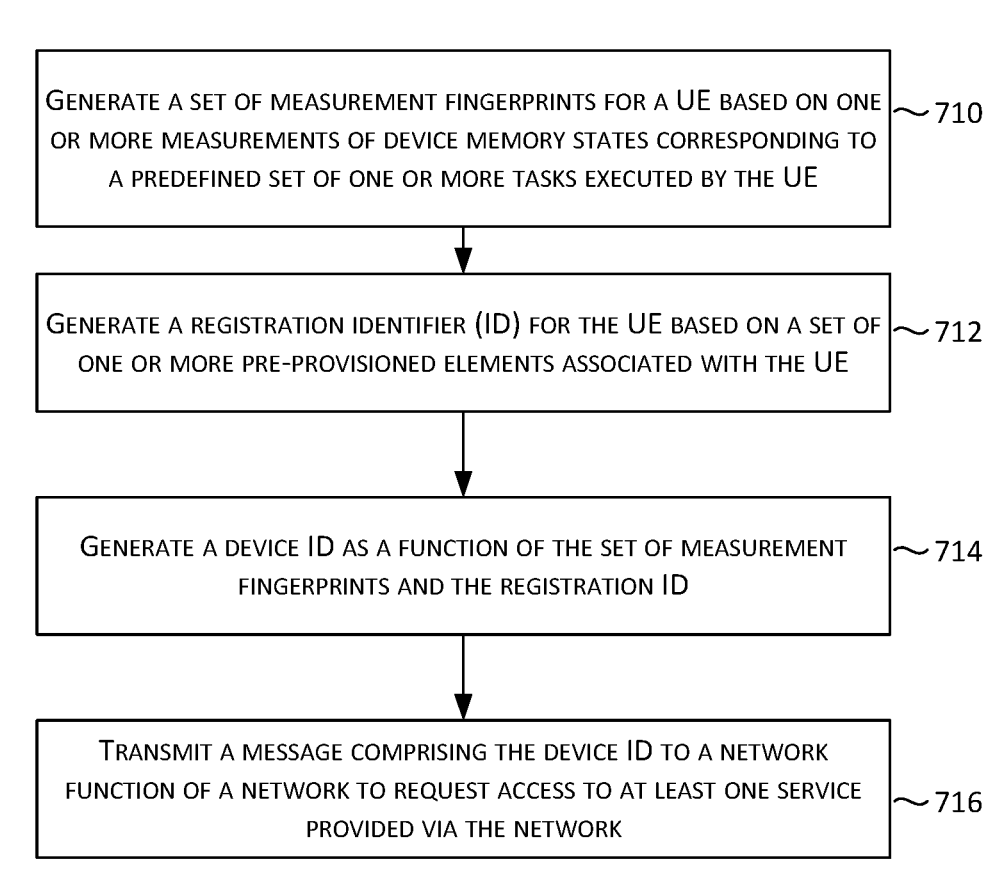

GENERATE A SET OF MEASUREMENT FINGERPRINTS FOR A UE BASED ON ONE OR MORE MEASUREMENTS OF DEVICE MEMORY STATES CORRESPONDING TO A PREDEFINED SET OF ONE OR MORE TASKS EXECUTED BY THE UE ～710

GENERATE A REGISTRATION IDENTIFIER (ID) FOR THE UE BASED ON A SET OF ONE OR MORE PRE-PROVISIONED ELEMENTS ASSOCIATED WITH THE UE ～712

GENERATE A DEVICE ID AS A FUNCTION OF THE SET OF MEASUREMENT FINGERPRINTS AND THE REGISTRATION ID ～714

TRANSMIT A MESSAGE COMPRISING THE DEVICE ID TO A NETWORK FUNCTION OF A NETWORK TO REQUEST ACCESS TO AT LEAST ONE SERVICE PROVIDED VIA THE NETWORK ～716

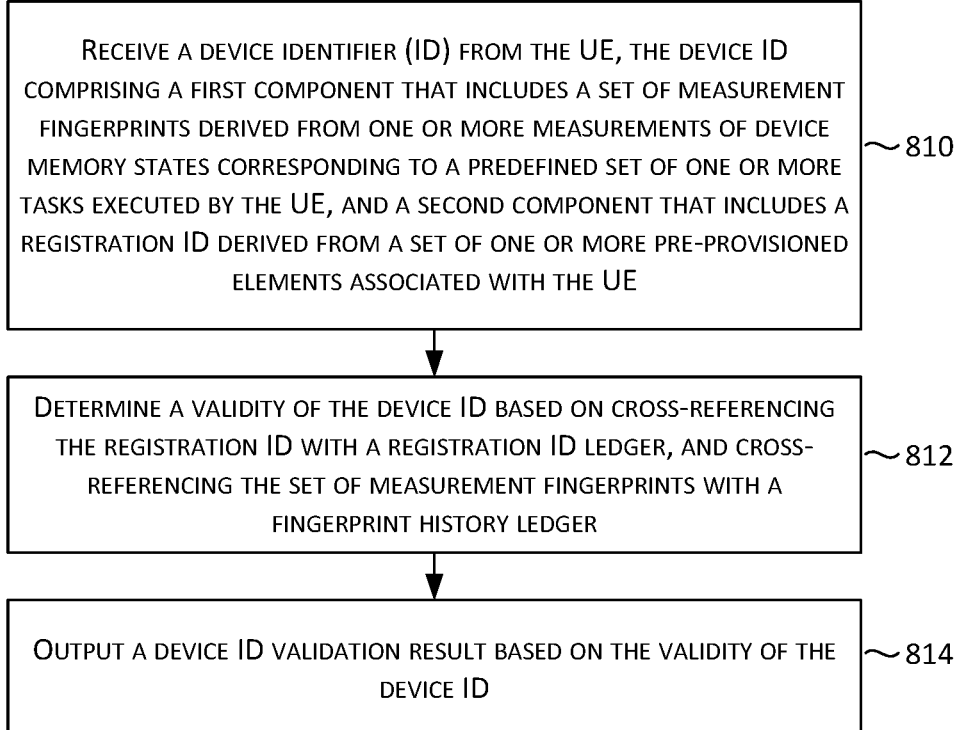

RECEIVE A DEVICE IDENTIFIER (ID) FROM THE UE, THE DEVICE ID COMPRISING A FIRST COMPONENT THAT INCLUDES A SET OF MEASUREMENT FINGERPRINTS DERIVED FROM ONE OR MORE MEASUREMENTS OF DEVICE MEMORY STATES CORRESPONDING TO A PREDEFINED SET OF ONE OR MORE TASKS EXECUTED BY THE UE, AND A SECOND COMPONENT THAT INCLUDES A REGISTRATION ID DERIVED FROM A SET OF ONE OR MORE PRE-PROVISIONED ELEMENTS ASSOCIATED WITH THE UE   ~810

DETERMINE A VALIDITY OF THE DEVICE ID BASED ON CROSS-REFERENCING THE REGISTRATION ID WITH A REGISTRATION ID LEDGER, AND CROSS-REFERENCING THE SET OF MEASUREMENT FINGERPRINTS WITH A FINGERPRINT HISTORY LEDGER   ~812

OUTPUT A DEVICE ID VALIDATION RESULT BASED ON THE VALIDITY OF THE DEVICE ID   ~814

FIG. 8

DYNAMIC IDENTIFICATION GENERATION FOR TELECOMMUNICATIONS NETWORK USER EQUIPMENT

BACKGROUND

When a device seeks access to services available from a telecommunications network, that device proceeds through a registration process with the network where the device is authenticated. Based on credentials presented by the device through authentication, the network is able to establish an identity of the device, determine one or more attributes about the device (e.g., the type of services that the device may access), and verify that the device is authorized to access the network (e.g., is attached to a subscriber account of an authorized user). In the art of 4G and 5G telecommunications networks today, Subscriber Identification Module (SIM) cards are a ubiquitous technology relied on by telecommunications networks to establish the veracity of a device requesting to authenticate with, and access, a network. SIM cards are often referred to as a "system on a chip" (SoC) because they comprise a complete computing system, including the components of a processor, memory, applications, and an operating system, all executed within the context of a secure enclave that can be traced back to a certifying authority. The SIM card is therefore well equipped with resources to execute complex standardized security protocols that include advanced computation of signatures, hashes, and encryption algorithms. As such, when a device is equipped with a SIM card (or the equivalent circuitry of an eSIM) presents identifying credentials to the network for authentication the device, the network can be confident that the device is what it appears to be, and access may be granted to the device.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The present disclosure is directed, in part, to systems and methods for dynamic identification generation for telecommunications network user equipment, substantially as shown and/or described in connection with at least one of the figures, and as set forth more completely in the claims.

One or more of the embodiments presented in the disclosure provide for, among other things, systems and methods to address one or more shortcomings of using 3GPP SIM technology. These embodiments provide an alternative protocol for generating a device identifier for a UE to use to request network access, and that can be trusted by a telecommunications network to grant access to network services. In some of the embodiments described herein, instrumentation instances are executed which may take measurements of UE device memory states to capture snapshots of memory states that may be used for measurement fingerprints. These measurement fingerprints may be combined with one or more pre-provisioned elements (e.g., hardware identifiers, shared keys, and/or other identifiers) to generate a device ID that comprises a unique identification for the UE. The device ID may be used as the UE ID by network functions of the operator network core for authenticating the UE, providing network services, and/or other purposes. In some embodiments, to validate the device ID, a network function receiving the device ID may cross-reference the registration ID component of the device ID with a registration ID ledger, and compare the set of measurement fingerprints of the device ID with prior measurement fingerprints from the UE from a fingerprint history ledger.

BRIEF DESCRIPTION OF THE DRAWINGS

Aspects of the present disclosure are described in detail herein with reference to the attached Figures, which are intended to be exemplary and non-limiting, wherein:

FIG. 2 is a diagram illustrating an example user equipment, in accordance with some embodiments described herein;

FIG. 7 is a flow chart illustrating an example method for dynamic device ID generation, in accordance with some embodiments described herein;

FIG. 8 is a flow chart illustrating an example method for dynamic device ID verification, in accordance with some embodiments described herein;

DETAILED DESCRIPTION

Figure 1:
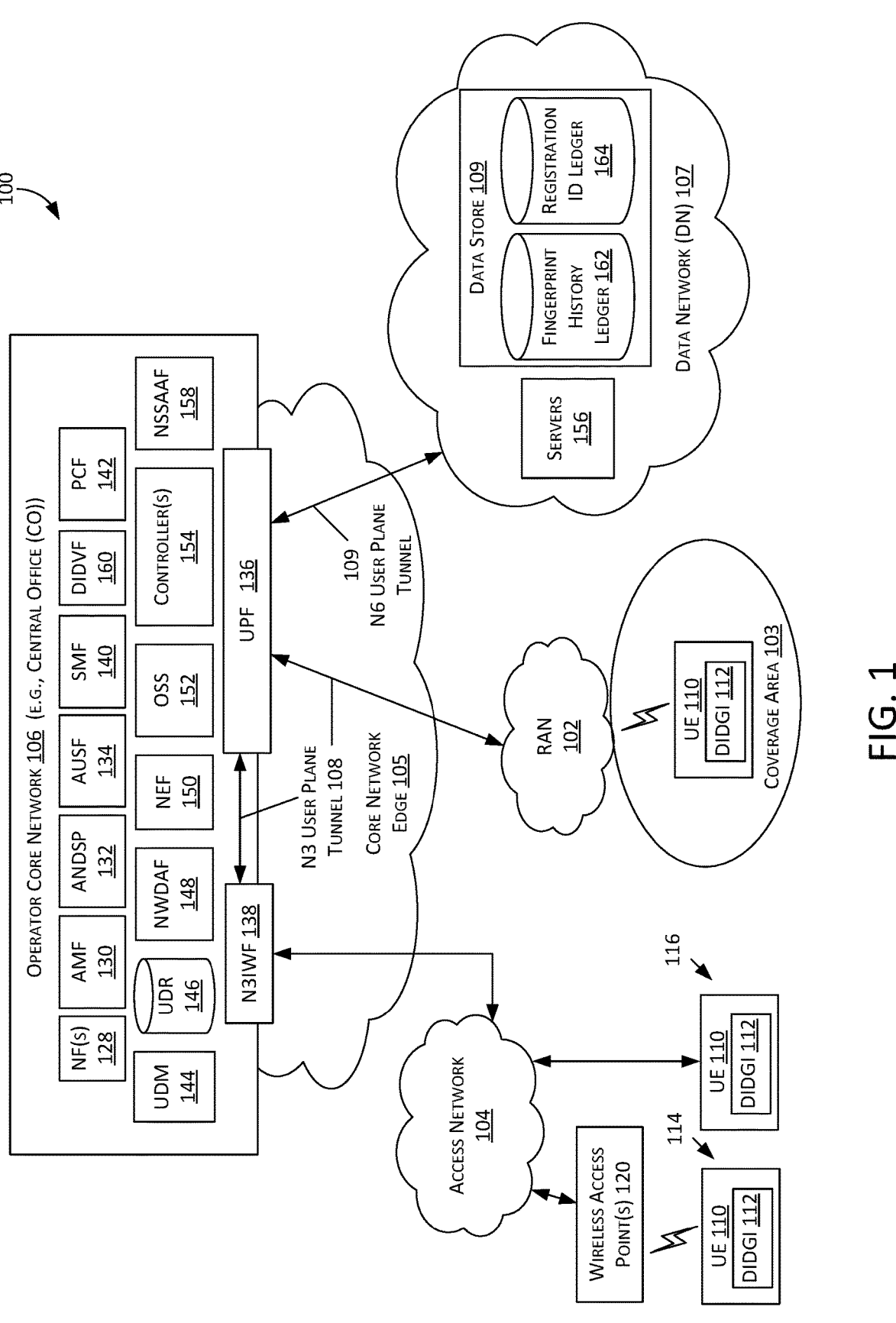
FIG. 1 is a diagram illustrating an example network environment, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

One or more of the embodiments presented in the disclosure provide for, among other things, systems and methods for dynamic identification generation for telecommunications network user equipment. When a device is equipped with a SIM card (or the equivalent circuitry of an eSIM) reads identifying information from user equipment and presents identifying credentials to the network to authenticate the user equipment, the network can be confident that the device is what it appears to be, and may be granted access. With the advent of 5G networking, many new forms of user equipment (UE), such as Internet-of-Things (IOT)

devices operate at least in part as networked devices in that they send and/or receive data while performing various tasks and operations. While many of these forms of user equipment may often generically be referred to as "smart devices", they may in fact comprise rudimentary on-device processing resource commiserate with their particular purpose. For example, a device that functions as a simple binary state sensor (e.g., a window opened/shut sensor) may need relatively little computing sophistication to produce a measurement of the binary state, and to execute a basic network interface software stack to communicate the binary state when polled by another device. Other only slightly more sophisticated sensors may take environmental measurements, such as temperatures, pressures, or humidity, for example. The incorporation of SIM technology into such sensors substantially increases the complexity of those sensors. Moreover, the expense of adding certified SIM circuitry to such sensors could easily exceed the summed cost of the balance of the sensor's components.

Embodiments, of the present disclosure, at least in part, address the shortcomings of using SIM technology by presenting an alternative protocol for generating a trustworthy identity for UE that request network access, and that can be used by a telecommunications network to grant the UE access to network services. Some of the embodiments described herein implement digital instrumentation in the form of software, which may take measurements of UE device memory states (e.g., measurements of stack and/or heap) to capture snapshots that may be used as digital device fingerprints. Such fingerprints obtained via digital instrumentation measurements are referred to herein as measurement fingerprints. These measurement fingerprints may be combined with one or more pre-provisioned elements (e.g., hardware identifiers, a shared key or keys, and/or other identifiers, as discussed below) to generate a unique identification which may be used as the UE's device ID (also referred to as the user equipment (UE) ID) by the operator network core for authenticating the device, providing network services, and/or other purposes.

More specifically, in some embodiments, a UE designed to seek network access may have a low-level set of software code referred to herein as dynamic identification generation instrumentation (DIDGI). The DIDGI may comprise a task (e.g., a process) executed by a bootloader of the UE (e.g., a basic input/output system (BIOS) or unified extensible firmware interface (UEFI)) along with startup sequence tasks, such as startup-diagnostics, prior to execution of the operating system. As the startup-sequence tasks are executed, they may perform tasks such as memory tests, and/or a check of firmware and/or software checksums (and/or hash codes) to ensure the integrity of such code (e.g., that it is free from corruption and/or tampering) before execution. Examples of tasks that may be included in a startup sequence may include one or more of, but not be limited to, a power-on self-test (POST), accessory component BIOS detection and start-up (e.g., detect and execute a video card BIOS code to initialize video hardware), detecting installed memory and perform memory tests, assigning resources such as DMA channel, and/or identifying a boot device (whether logical or physical) where the device operating system resides.

The stack memory and the heap memory regions of UE memory, referred to herein collectively as the stack-heap, are allocated regions of random access memory (RAM). As the term is used herein, a "stack-heap" collectively refers to the stack memory and the heap memory so that references to storing data to, or taking measurements of, a "stack-heap"

may include storing data to, or taking measurements of, a stack memory, a heap memory, or both. The stack portion of the stack-heap is a defined segment of RAM where an executing process may temporarily store data. Typically, the stack stores data such as variables, address, arguments, and other data that supports function execution, until that function has completed its task at which point the stack becomes free for use by other function calls. The heap may comprise dynamic memory which may be allocated to a software module until the module surrenders use of the memory, at which point it may be reused by other modules. As the startup-sequence performs tasks, those tasks read, record, and swap various items of data to the UE memory in a portion of memory defined as the stack-heap for those tasks.

Execution of the DIDGI may be performed with, or after, execution of the start-up sequence tasks. When executed, the DIDGI establishes (executes) one or more instrumentation instances and may also establish a trust zone. In some embodiments, the instrumentation instances may be executed within the context of the trust zone. For example, an instrumentation instance may comprise a daemon or similar process that collects data from an application or the underlying system. Measurements obtained from instrumentation instances may be used to derive measurement fingerprints recorded to the trust zone. The instrumentation instances may obtain one or more measurements of the start-up sequence tasks stack-heap (e.g., either during and/or after execution of the start-up sequence) as UE measurement fingerprints which may be recorded to the trust zone. For example, a measurement fingerprint may be derived from the binary values of memory registers and/or locations. A measurement fingerprint may comprise a sum, hash, or other statistical computation performed using the data stored in the start-up stack-heap. In some embodiments, the measurement fingerprint may comprise an imprint from the stack-heap of code used to perform the start-up sequence tasks.

Because of the nature of the tasks performed during the UE device start-up sequence, the data stored to the startup stack-heap should not deviate from one start-up of the UE to the next startup of that UE. The measurement fingerprints obtained by the instrumentation instances from the startup stack-heap should therefore also remain consistent from one device startup-up to the next. While the start-up diagnostic may compute a result indicating the integrity of the device's firmware/start-up code and memory, a consistency in measurement fingerprints from the start-up sequence indicate that the startup sequence executed consistently from one device start-up to the next. The presence of an unauthorized modification to the code performing the startup sequence may result in the introduction of unrecognized binary sequences in the stack-heap, and/or an unexplained shifting (e.g., offset) of previously recognized binary sequences within the stack-heap—which would be manifest in an unrecognized, anomalous measurement fingerprint as measured by the instrumentation instances.

Upon successful completion of the start-up sequence, the boot loader may next boot the UE operating system. As the UE operating system is initialed, it also performs tasks, that read, record, and swap various items of data to the UE memory in a portion of memory defined as the stack-heap for those operating system tasks. Accordingly, measurement fingerprints may also be obtained by the instrumentation instances from the operating system stack-heap.

Because of the nature of the tasks performed during operating system initialization, at least some data stored to the operating system stack-heap should not deviate (either in content and/or location in memory) from one UE start-up to the next start-up of that UE. Measurement fingerprints obtained by the instrumentation instances from the operating system stack-heap should therefore also remain consistent from one operating system initialization to the next. The presence of an unauthorized modification to the code performing the operating system initialization may result in the introduction of unrecognized binary sequences in the stack-heap, and/or an unexplained shifting (e.g., offset) of previously recognized binary sequences within the stack-heap— which may be manifest in an unrecognized, anomalous measurement fingerprint. A consistency in measurement fingerprints from operating system initialization start-up indicates that the operating system initialization executed consistently from one UE start-up to the next.

Instrumentation measurement fingerprints from UE start-up sequence tasks and operating system initialization may be recorded to the trust zone and serve as indications that the process by which the UE device was brought into its operating state was free from anomalies that may have been introduced by corrupt or unauthorized manipulation. In some embodiments, other tasks may be serve as a source of measurement fingerprints. For example, the process of device network registration (e.g., the primary authentication process performed with the operator network core) may consistently produce artifacts in a memory stack-heap that may be measured by the instrumentation instances of the DIDGI.

The DIDGI may also execute a process referred to herein as a device ID generator. In some embodiments, the device ID generator may dynamically compute a device ID for the UE using, in part, the measurement fingerprints recorded to the trust zone, together with one or more pre-provisioned elements (e.g., such as identifiers and/or shared keys).

The device ID generator may be activated in response to receiving a predetermined set of measurement fingerprints in the trust zone. For example, in some embodiments, a pre-determined set of measurement fingerprints may include the startup-up measurement fingerprints, OS initiation fingerprints, and network registration fingerprints. In some embodiments, unless that pre-determined set of measurement fingerprints is recorded to the trust zone, the DIDGI will not proceed to activate the device ID generator. Once the complete set is present, the DIDGI may proceed to activate the device ID generator. In some embodiments, the device ID generator is activated in response to a request or other need to supply a device ID to the network. In some embodiments, one or more of the measurement fingerprints may be periodically refreshed during device operation so that the device ID generator revalidates the device ID periodically.

The device ID generated by a UE may be evaluated by a device ID validation function (DIDVF) of the operator core network to determine if the device ID generated by the UE is accepted as valid. Consistency in a UE's set of measurement fingerprints over time, as indicated by a consistent device ID over time, provides the operator core network a degree of assurance that the integrity of the UE's programming is untainted. Advantageously, generating a device ID based on a combination of measurement fingerprints together with pre-provisioned identifiers establishes a unique identification that functions of the operator core network may use to provision services to the UE, and track activities and usage of the UE on the network, without the computing complexity and computing resources needed to accomplish those tasks using SIM based technologies.

FIG. 1 is a diagram illustrating an example network environment 100 embodiment for a wireless communication system. Network environment 100 is but one example of a suitable telecommunications network and is not intended to suggest any limitation as to the scope of use or functionality of the embodiments disclosed herein. Neither should the network environment be interpreted as having any dependency or requirement relating to any one or combination of components illustrated.

As shown in FIG. 1, network environment 100 comprises an operator core network 106 (also referred to as a "core network") that provides one or more network services to one or more UE 110 via at least one access network, such as radio access network 102 and/or access network (AN) 104. In some embodiments, network environment 100 comprises, at least in part, a wireless communications network.

In some embodiments, the radio access network 102 comprises one or more radio access networks (RANs). Each RAN may provide wireless connectivity access to one or more UE operating within a coverage area 103 associated with that RAN 102. A RAN is often referred to as a base station, cell site, or cellular base station. The RAN may implement wireless connectivity using, for example, 3GPP technologies. The RAN 102 may be referred to as an eNodeB in the context of a 4G Long-Term Evolution (LTE) implementation, a gNodeB in the context of a 5G New Radio (NR) implementation, or other terminology depending on the specific implementation technology. In some embodiments, the RAN 102 may comprise in part components of a customer premises network, such as a distributed antenna system (DAS) for example. In some embodiments, the RAN 102 may comprise a non-terrestrial base station, such as a base station implemented by an Earth orbiting satellite.

The access network 104 may comprise a non-3GPP customer premises network, such as a local area network or intra-net. The access network 104 may provide wired access to one or more UE 110 (such as shown at 116). The access network 104 may provide wireless access to one or more UE 110 (such as shown at 114) via one or more wireless access points 120 (WAPs) such as, but not limited to, IEEE 802.11 (WiFi), and/or IEEE 802.15 (Bluetooth) access points.

One or both of radio access network 102 and/or access network 104 may comprise a multi-modal network (for example comprising one or more multi-modal access devices) where multiple radios supporting different systems are integrated into the access networks 102 and 104. Such a multi-modal access network may support a combination of 3GPP radio technologies (e.g., 4G, 5G and/or 6G) and/or non-3GPP radio technologies. In some embodiment, the radio access network may comprise a terrestrial wireless communications base station and/or may be at least in part implemented as a space-based access network (e.g., comprising a space-based wireless communications base station).

Individual UE 110 may communicate with the operator core network 106 via the RAN 102 over one or both of uplink (UL) radio frequency (RF) signals and downlink (DL) radio frequency (RF) signals. Individual UE 110 may also, or instead, communicate with the operator core network 106 via the access network 104 over one or both of uplink (UL) radio frequency (RF) signals and downlink (DL) radio frequency (RF) signals and/or via wired network connections.

The radio access networks 102 and/or access network 104 may be coupled to the operator core network 106 via a core network edge 105 that comprises wired and/or wireless network connections that may themselves include wireless relays and/or repeaters. In some embodiments, the RAN 102 and/or access network 104 may be coupled to the operator core network 106 at least in part by a backhaul network such as the Internet or other public or private network infrastructure. Core network edge 105 comprises one or more network nodes or other elements of the operator core network 106 that may define the boundary of the operator core network 106 and may serve as the architectural demarcation point where the operator core network 106 connects to other networks such as, but not limited to RAN 102 and/or access network 104, the Internet, and/or other third-party networks.

It should be understood that in some aspects, the network environment 100 may not comprise a distinct network operator core 106, but rather may implement one or more features of the network operator core 106 within other portions of the network, or may not implement them at all, depending on various carrier preferences.

As shown in FIG. 1, network environment 100 may also comprise at least one data network (DN) 107 coupled to the operator core network 106 (e.g., via the network edge 105). Data network 107 may include a data store 109 that includes a fingerprint history ledger 162 and/or a registration ID ledger 164, as further discussed herein. In some embodiments, UE 110 may access services and/or content provided by one or more content-services servers 156 of DN 107. In some embodiments, servers 156 may include one or more client systems that access records of the fingerprint history ledger 162 and/or registration ID ledger 164 to perform one or more operations. As discussed in greater detail below, the fingerprint history ledger 162 and/or registration ID ledger 164 may comprise an element of a distributed ledger network (DLN) and/or distributed ledger technology (DLT) based records repository.

Generally, an individual UE 110 may comprise a device capable of unidirectional or bidirectional communication with the operator core network 106 via wireless and/or wired communication links. The network environment 100 may be configured for wirelessly connecting UEs 110 to other UEs 110 via the same access networks 102, 104, via other access networks, via other telecommunication networks, and/or to connect UEs 110 to a publicly-switched telecommunication network (PSTN). The network environment 100 may be generally configured for wirelessly connecting a UE 110 to data or services that may be accessible on one or more application servers or other functions, nodes, or servers. The network environment 100 may be generally configured, in some embodiments, for connecting UE 110 to data, content, and/or services that may be accessible from one or more application servers or other functions, nodes, or servers (such as by servers 156 of data network 107). In allocating network resources and access to these data or services, the network operator core 106 may uniquely identify a UE 110 based on the device ID generated by UE executed dynamic identification generation instrumentation (DIDGI) 112.

UE 110 are in general, forms of equipment and machines such as but, not limited to, Internet-of-Things (IOT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. That said, in some embodiments, UE 110 may include computing devices such as, but not limited to, handheld personal computing devices, cellular phones, smart phones, tablets, laptops, and similar consumer equipment, or stationary desktop computing devices, workstations, servers and/or network infrastructure equipment. As such, the UE 110 may include both mobile UE and stationary UE. Moreover, UE 110 may comprise 3GPP and non-3GPP devices.

The UE 110 can include one or more processors, and one or more non-transient computer-readable media for executing code to carry out the functions of the UE 110 described herein (including in some embodiments, one or more functions of the DIDGI 112). The computer-readable media may include computer-readable instructions executable by the one or more processors. In some embodiments, the UE 110 may be implemented using a computing device 900 as discussed below with respect to FIG. 9.

In some implementations, the operator core network 106 may comprise modules, also referred to as network functions (NFs), generally represented in FIG. 1 as NF(s) 128. Such network functions may include, but are not limited to, one or more of a core access and mobility management function (AMF) 130, an access network discovery and selection policy (ANDSP) 132, an authentication server function (AUSF) 134, a user plane function (UPF) 136, non-3GPP Interworking Function (N3IWF) 138, a session management function (SMF) 140, a policy control function (PCF) 142, unified data management (UDM) 144, an unified data repository (UDR) 146, Network Data Analytics Function (NWDAF) 148, a network exposure function (NEF) 150, an operations support system (OSS) 152, and a Network Slice Specific Authentication and Authorization Function (NSSAAF) 158. Implementation of these NFs of the operator core network 106 may be executed by one or more controllers 154 on which these network functions are orchestrated or otherwise configured to execute utilizing processors and memory of the one or more controllers 154. The NFs may be implemented as physical and/or virtual network functions, container network functions, and/or cloud-native network functions.

Notably, nomenclature used herein is used with respect to the 3GPP 5G architecture. In other aspects, one or more of the network functions of the operator core network 106 may take different forms, including consolidated or distributed forms that perform the same general operations. For example, the AMF 130 in the 3GPP 5G architecture is configured for various functions relating to security and access management and authorization, including registration management, connection management, paging, and mobility management; in other forms, such as a 4G architecture, the AMF 130 of FIG. 1 may take the form of a mobility management entity (MME). The operator core network 106 may be generally said to authorize rights to and facilitate access to an application server/service such as provided by application function(s) requested by one or more UE, such as UE 110. In some embodiments, the at least one data network (DN) 107 may be coupled to the operator core network 106, for example via the network edge 105.

As shown in FIG. 1, UPF 136 represents at least one function of the operator core network 106 that may extend into the core network edge 105. In some embodiments, the RAN 102 is coupled to the UPF 136 within the core network edge 105 by a communication link that includes an N3 user plane tunnel 108. For example, the N3 user plane tunnel 108 may connect a cell site router of the RAN 104 to an N3 interface of the UPF 136. As previously mentioned, fingerprint history ledger 162 and/or registration ID ledger 164 may be implemented at least in part by a data store 109 within the DN 107. The data store 109 may be coupled to the UPF 136 in the core network edge 105 by a N6 user plane tunnel 109. For example, the N6 user plane tunnel 109 may connect a network interface (e.g., a switch, router and/or gateway) of the DN 107 to an N6 interface of the UPF 136. In some embodiments, the operator core network 106 may comprise a plurality of UPFs 236, such as a UPF at the operator core network 106 and a UPF at the core network edge 105. For example a UPF at the core network edge 105 may be used for local break out and/or low latency types of application via an N9 interface between the two UPFs.

Figure 10:
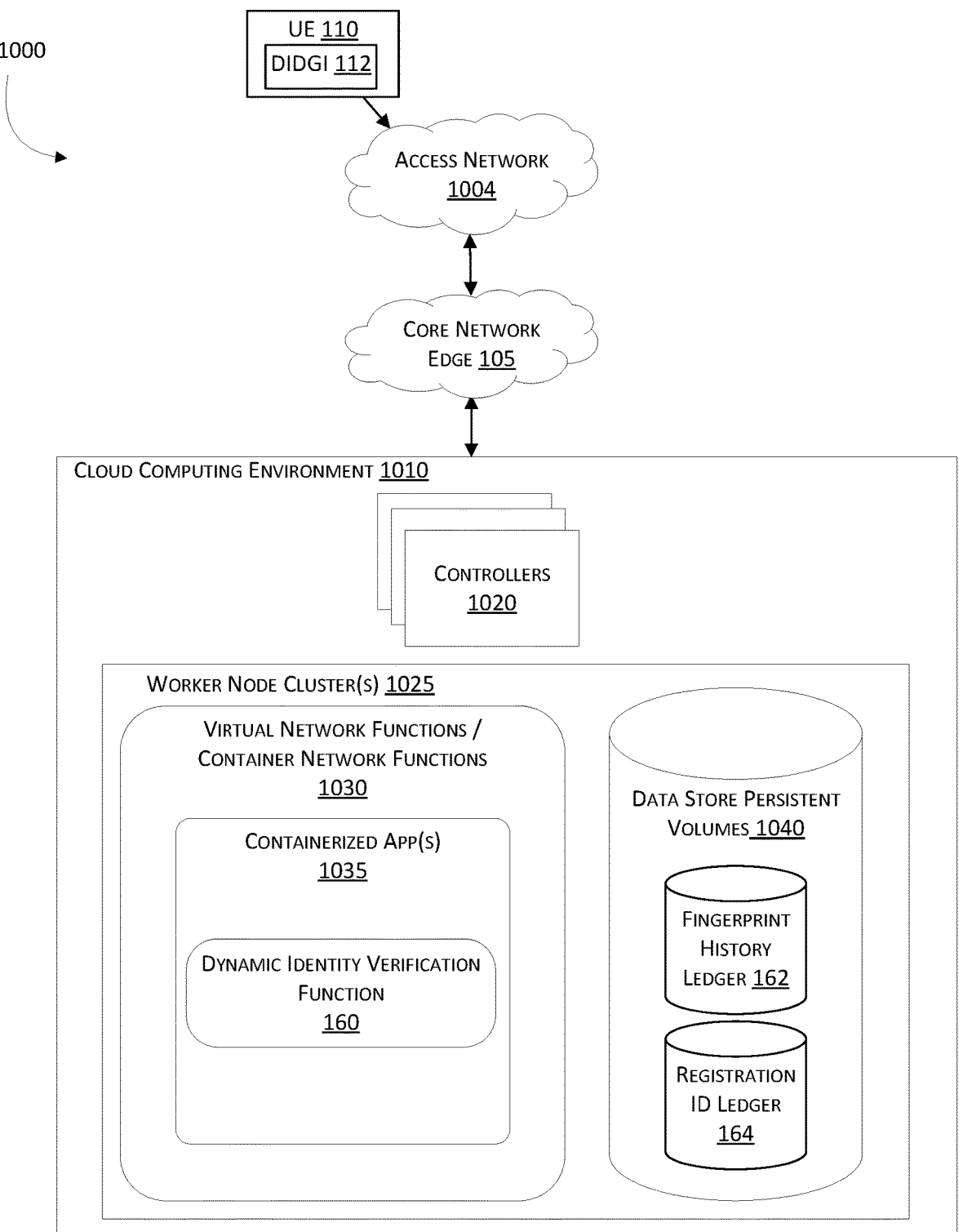
FIG. 10 is an example cloud computing platform, in accordance with some embodiments described herein.

In some embodiments, the fingerprint history ledger 162 and/or registration ID ledger 164 may be implemented at least in part as a component of the operator core network 106, or other locations. For example, the fingerprint history ledger 162 and/or registration ID ledger 164 may be implemented outside the operator core network 106 in a cloud computing environment (e.g., as shown in FIG. 10). In some embodiments, the fingerprint history ledger 162 and/or registration ID ledger 164 may be implemented at the enterprise level. For example, an enterprise organization may provide authentication services to authenticate UE 110 devices of their direct customers based on a DIDGI 112 generated device ID. The operator core network 106 may operate in such an embodiment to relay authentication requests to the enterprise authentication authority (e.g., an AAA server) to validate the device ID. In some embodiments, the operator core network 106 may communicate with the AAA server using the NSSAAF 158.

The AMF 130 facilitates mobility management, registration management, and connection management for 3GPP devices such as a UE 110. ANDSP 132 facilitates mobility management, registration management, and connection management for non-3GPP devices. AUSF 134 may receive authentication requests from the AMF 130 and interacts with UDM 144, for example, for SIM authentication and/or to authenticate a UE 110 based on a DIDGI 112 generated device ID. N3IWF 138 provides a secure gateway for non-3GPP network access, which may be used for providing connections for UE 110 access to the operator core network 106 over a non-3GPP access network. SMF module 140 facilitates initial creation of protocol data unit (PDU) sessions using session establishment procedures. The PCF 142 maintains and applies policy control decisions and subscription information. Additionally, in some aspects, the PCF 142 maintains quality of service (QOS) policy rules. For example, the QoS rules stored in a unified data repository (UDR) 146 can identify a set of access permissions, resource allocations, or any other QoS policy established by an operator. In some embodiments, the PCF 142 maintains subscription information indicating one or more services and/or micro-services subscribed to by each UE 110. The UDM 144 manages network user data including, but not limited to, data storage management, subscription management, policy control, and core network 106 exposure. NWDAF 148 collects data (for example, from UE, other network functions, application functions and operations, administration, and maintenance (OAM) systems) that can be used for network data analytics. The OSS 152 is responsible for the management and orchestration of the operator core network 106, and the various physical, virtual network functions, container network functions, controllers, compute nodes, and other elements that implement the operator core network 106. The NSSAAF 158 supports network slice-specific authentication and authorization with an Authentication Authorization and Access (AAA) Server (AAA-S). An AAA server provides authentication, authorization, policy control and routing information to packet gateways for 3GPP Wi-Fi access.

Some aspects of network environment 100 include the UDR 146 storing information relating to access control and service and/or micro-service subscriptions. The UDR 146 may be configured to store information relating to such subscriber information and may be accessible by multiple different NFs in order to perform desirable functions. For example, the UDR 146 may be accessed by the AMF 130 in order to determine subscriber information pertaining the UE 110, accessed by a PCF 142 to obtain policy related data, accessed by NEF 150 to obtain data that is permitted for exposure to third party applications (such as applications executed by UE 110, for example). Other functions of the NEF 150 include monitoring of UE related events and posting information about those events for use by external entities, and providing an interface for provisioning UEs (via PCF 142) and reporting provisioning events to the UDR 146. Although depicted as a unified data management module, UDR 146 can be implemented as a plurality of network function (NF) specific data management modules.

The UPF 136 is generally configured to facilitate user plane operation relating to packet routing and forwarding, interconnection to a data network (e.g., DN 107), policy enforcement, and data buffering, among other operations. Using network slicing (e.g., using 5G software-defined networking (SDN) and/or 5G network slice selection function (NSSF)), the UPF 136 may establish a dedicated network slice for one or more data channels of the UE 110 that act as, in essence, as a distinct network (for example, establishing its own QoS, provisioning, and/or security) within the same physical network architecture of the core network edge 105. For example, in different implementations, a UE 110 may be assigned a network slick such as an Enhanced Mobile Broadband (eMBB) 5G network slice, a Massive Machine Type Communications (MMTC) 5G network slice, an Ultra-Reliable Low Latency Communication (URLLC) 5G network slice, or a Public Safety (PS) 5G network slice.

In some embodiments, the access network 104 comprises a non-3GPP access network 104 (such as a customer premise equipment (CPE) network for example). For example, the access network 104 may comprise a wide area network (WAN) or local area network (LAN) and/or may include one or more wireless access points (WAPs) 120. In such embodiments, the non-3GPP access network 104 represents an untrusted network from the perspective of the operator core network 106, and the UE 110 that access the access network 104 may represent untrusted UE 110. Accordingly, communication between the operator core network 106 and UE 110 connecting via the access network 104 may be established via the non-3GPP Interworking Function (N3IWF) 138. For example, in some embodiments, a UE 110 (such as shown at 114) may authenticate with a WAP 120 of the access network 104 to establish a wireless communications link with the access network 104. In some embodiments, a UE 110 (such as shown at 116) may be coupled using a network cable to establish a wired network communication link with the access network 104.

The non-3GPP access network 104 may be coupled to, and authenticated with, the N3IWF 138 of the operator core network 106. For example, an IPsec user plane tunnel and/or IPsec control plane tunnel may be created to establish a secure communication link between the UE 110 and the N3IWF 138. The N3IWF 138 may be coupled to the UPF 136 by a communication link that includes an N3 user plane tunnel 108. For example, the N3 user plane tunnel 108 may connect a router or network gateway of the non-3GPP access network 104 to an N3 interface of the UPF 136.

As previously discussed, dynamic identification generation instrumentation, such as DIDGI 112 may execute one or more instrumentation instances and a device ID generator on the UE 110. The instrumentation instances function to measure the state of UE memory, such as stack-heap memory used by bootloader startup sequence tasks and/or operating system initialization tasks (and/or other tasks such as network registration tasks) to generate a set of measurement fingerprints. The device ID generator functions to derive a unique device ID for an individual UE 110 as a function of the set of measurement fingerprints and one or more pre-provisioned identifiers (which may include hardware identifiers and/or shared keys, and/or other identifiers as discussed below). In some embodiments, the pre-provisioned identifiers are processed to define a registration ID associated with the individual UE 110, and the registration ID combined with the set of measurement fingerprints to form the device ID.

As an example, in some embodiments, the pre-provisioned identifiers may comprise one or more embedded serial numbers or other identifiers programmed into the UE, for example, by the manufacturer or by the network operator. Pre-provisioned identifiers may comprise, for example, a device package ID, a library ID, serial numbers or unalterable identifiers embedded in the UE. For a UE 110 that does comprise a SIM card or eSIM, then pre-provisioned identifiers build into SIM technology may be used to derive the registration ID. Moreover, in such embodiments where a UE does comprise SIM technology, the set of measurement fingerprints may include measurement fingerprints generated by using instrumentation instances to measure memory states from the operation of the SIM.

As a non-exhaustive listing of identifiers that may be used by the DIDGI 112 as pre-provisioned elements, pre-provisioned element may include one or more of: an International Mobile Equipment Identity (IMEI) identifier and/or a Mobile Equipment Identifier (MEID) (e.g., which be stored in a subscriber identity module (SIM) card or embedded SIM (eSIM) of the UE 110), one or more elements of an integrated circuit card identifier (ICCID), a permanent equipment identifier (PEI), a mobile subscriber international subscriber directory number (MSISDN), a mobile subscription identification number (MSIN), an international mobile subscriber identity (IMSI), mobile country codes (MCC), a subscription permanent identifier (SUPI), mobile network codes (MNC), a UE serial number, a CPU serial number, a device hardware serial number and/or other identifiers. Other example pre-provisioned elements may include keys or other authentication vectors, for example, authentication vectors corresponding to EAP-AKA' and/or 5G-AKA authentication protocols. In some embodiments, a pre-provisioned element associated with the UE may be based on a value generated by a random generator, independent of any other pre-provisioned elements.

In some embodiments, the pre-provisioned element may comprise one or more decentralized identifiers (DIDs), such as World Wide Web Consortium (W3C) DIDs for example. In some embodiments, a pre-provisioned element may comprise a DID that resolves to a DID document. The DID document may be stored at a data registry (e.g., a verifiable data registry). For example, a DID may include a Universal Resource Identifier (URI) that associates a UE 110 (as a DID subject) with a DID document. The DID may include, for example, cryptographic public keys that the UE 110 may use to authenticate itself with the operator core network 106, and prove its association with the DID (e.g., the device ID). In some embodiments, the pre-provisioned element may be based on a self-sovereign identity (SSI) paradigm. For example, the UE 110 may present a pre-provisioned element to the operator core network 106, which may verify that the pre-provisioned element was issued from a trusted issuer. In some embodiments, a pre-provisioned element may comprise a combination of identifiers such as any of those described herein. In some embodiment one or more of the pre-provisioned elements may be managed and verified using public-key cryptography in conjunction with a distributed ledger (e.g., using a Dapp, crypto wallet, or the like, for example). For example, in some embodiment the pre-provisioned element for a UE 110 may be generated by back-end blockchain ledger or other blockchain technology and downloaded to the UE 110.

In other words, the pre-provisioned element may comprise one of, or a combination of, hardware identifiers, network address identifiers, serial numbers, keys, sequences, component identifiers (e.g., CPU IDs), and/or other identifiers such a as discussed herein.

For a given UE, a designated set of one or more pre-provisioned elements may be used as inputs to the DIDGI 112 for deriving a unique registration ID that is uniquely associated with that UE. For example, a hash code algorithm may be computed from the set of pre-provisioned elements to derive the registration ID. The registration ID may be combined with the measurement fingerprints to form the device ID that is passed to the network for registering (e.g., provisioning) the UE 110 with the operator network core 106.

As illustrated in FIG. 1, in some embodiments, to validate a DIDGI 112 generated device ID that is received from a UE 110, the operator core network may comprise a device ID validation function (DIDVF) 160. The DIDVF 160 may be implemented as an independent network function 128 of the operator core network 106, or integrated at least in part into another network function involved in device registration such as the AUSF 134 and/or the AMF 130. As explained in greater detail below with respect to FIG. 5, to validate the device ID, the registration ID component of the device ID may be cross-referenced with the registration ID ledger 164, and the set of measurement fingerprints of the device ID cross-referenced with prior measurement fingerprints from the UE 110 from the fingerprint history ledger 162.

For example, in some embodiments, a UE 110 may communicate an authorization request to the operator core network (via the access network 104 or RAN 102) that includes the DIDGI 112 generated device ID. The authorization request may be process by the AMD 130 and/or AUSF 134, which refer the device ID to the DIDVF 160 for validation. The DIDVF 160 may compute a deviation between the DIDGI 112 generated device ID and what the device ID should be based on cross referencing with records of the registration ID ledger 164 and fingerprint history ledger 162. If the computed deviation is within an acceptance criteria then the device ID offered by the UE 110 may be accepted. If the deviation is in excess of the acceptance criteria, then device ID is not accepted and registration of UE 110 on the network may be rejected. While individual UE 110 may be different from each other with respect to the pre-provisioned identifiers that form its registration ID, the UE's measurement fingerprints may be expected to maintain a consistency over time. The combination of using measurement fingerprints and pre-provisioned identifiers yields a self-attesting unique device ID for that UE 110 without a need for a centralized certification authority or resources to execute SIM and/or eSIM like protocols.

With reference now to FIG. 2, FIG. 2 illustrates an example UE 110 that executes one or more elements of a DIDGI 112. Although some UEs may include different or other components, generally UE 110 may include at least one radio module 210 that includes one or more RF transmit (TX) path 212 circuits, one or more RF receive (RX) path 214 circuits, and a controller 216. Configuration of the RF TX path 212 and/or RF RX path 214 may be controlled by the radio module 210, for example based on commands from the operating system 220 or other applications (e.g., application(s) 224) executed on the controller 216. In some embodiments one or both of the TX path 212 and/or RF RX path 214 may comprise a plurality of RF paths, each corresponding to different frequency bands. In some embodiments, the UE 110 in FIG. 2 may authenticate with the operator core network 106 and access the telecommunications network through the RAN 102 and/or access network 104, for example, using the radio module 210. In some embodiments, the UE 110 may further include at least one network interface 215 for connecting to the access network 104 and/or core network edge 105 via a wired connection.

In the embodiment shown in FIG. 2, the UE 110 includes operating system 220 and one or more executable applications 224 that are executed by the controller 216 to implement the one or more functions of the UE 110 described herein. Generally a UE 110 includes an application layer 222. The application layer 222 facilitates execution of the UE 110 operating system 220 and executables (including application(s) 224). In other words, the application layer 222 provides the direct user interaction environment for the UE 110. As shown in FIG. 2, the UE 110 may include a boot loader 218 that comprises the initial computing code executed by the UE in response to power-up of the UE 110. As previously discussed, the boot loader 218 may include one or more startup sequence tasks 219 that are executed to preform one or more diagnostic tests of the UE 110 in preparation for executing the operating system 220. When the boot loader 218 successfully completes the startup sequence tasks 219, it may initiate execution of the operating system 220. As discussed above, in executing the startup sequence tasks 219 and/or the operating system 220 data is stored to a stack-heap 232 in the memory 230 of the UE 110, which may be measured to obtain measurement fingerprints for generating a device ID.

As illustrated in FIG. 2, the DIDGI 112 may comprise one or more instrumentation instances 240 that are executed to obtain measurements of the stack-heap 232 to produce the set of measurement fingerprints. The DIDGI 112 may also comprise a device ID generator 242 that is executed to generate the registration ID from pre-provisioned elements and compute the device ID from the set of measurement fingerprints and the registration ID. In some embodiments, one or more functions of the DIDGI 112 may be directly executed by the boot loader 218 (for example, prior to initializing the operating system 220). For example, the boot loader 218 may execute the DIDGI 112 to instantiate one or more instrumentation instance 240 to obtain one or more measurements of the start-up sequence tasks stack-heap (from stack-heap 232) corresponding to execution of the start-up sequence tasks 219 and/or to obtain one or more measurements of the operating system stack-heap (from stack-heap 232) corresponding to execution of the operating system 220. The resulting measurement fingerprints may be stored to the trust zone 234. The DIDGI 112 may then activate the device ID generator to compute the registration ID and derive the device ID one the designate set of measurement fingerprints are obtained. By utilizing the trust zone 234 for storing and obtaining the measurement fingerprints, there is a degree of trust that the measurement fingerprints used by DIDGI 112 are free from tampering (e.g., such as tampering that may be used to obscure unauthorized modifications to the code of start-up sequence tasks 219 and/or operating system 220).

In some embodiments, the UE 110 may include a trusted execution environment (TEE) 226. A TEE 226 may facilitate a secure area of the processor(s) of UE 110 that provides an environment in the UE 110 where isolated execution and confidentiality features are enforced. Example TEEs that may be used for UE 110 include, but are not limited to, Arm TrustZone technology, Software Guard Extensions (SGX) technology, Reduced Instruction Set Computer-Five (RISC-V), or similar technologies. In some embodiments, the TEE 226 includes the trust zone 234 established in region of the memory 230. In embodiments where the UE 110 does not comprise a TEE 226 or other hardware that comprises a secure enclave, the trust zone 234 may be established in the memory 230 by the DIDGI 112, boot loader 218, and/or other code executed by the controller 216, as a software generated trust zone 234 (e.g., a software trust zone).

For example, one or more components of the DIDGI 112 may be implemented by an application 224 of the application layer 222. The DIDGI 112 may be executed in the rich environment, and/or at least partially executed in the TEE 226. That is, the DIDGI 112 may be implemented at least in part as a "trustlet" in a trusted environment protected from tampering or manipulation by a hardware Root of Trust and hosted from the TEE 226. The DIDGI 112 may instead, or additionally, be implemented at least in part as a "trustlet" using the trust zone 234 in a trusted environment protected from tampering or manipulation.

Generally, computer readable code executed in the TEE 226 and/or trust zone 234 is referred to as a "trustlet". A trustlet can securely access data stored in memory of the UE 110 that is otherwise inaccessible by the application layer 222. A trustlet may take the form of trusted processes, secure processes, isolated user mode (IUM) processes, or the like. For example, a trustlet executed in TEE 226 can access system level data (that is, data related to the larger machine the UE 110 in incorporated within), private and/or public keys, and similar data stored, or accessed, by the UE 110. Trustlets can be activated in response to various network or UE operations. For example, a trustlet can be activated by execution of an associated application in the application layer 222. For another example, a trustlet can be activated in response to a command generated by a network (e.g., network operator core 106 of FIG. 1) and communicated to the UE 110. The trustlet(s) activated may vary depending on the service requested. For example, a first trustlet may be activated in response to a voice service. A second trustlet may be activated in response to a messaging service. A third trustlet may be activated in response to a data service that facilitates a telemetry update. Similarly, the trustlet(s) activated may vary within a particular type of service. For example, a fourth trustlet may be activated to support the function of the DIDGI 112. Specifically an application 224 implementing the DIDGI 112 may activate one or more trustlets that perform functions of the instrumentation instances 240, functions of the instrumentation instances device ID generator 242 and/or that may interact with other trustlets. Upon activation, a trustlet performs a set of predetermined operations. The operations can include, but are not limited to: assessing data stored by the UE, (such as a set keys that are embedded directly into a processor or microcontroller during manufacturing, certificates of authority, unique device identifiers, or any other data); monitoring operations of the UE (such as monitoring processor load, microcontroller load, activation of other UE systems, or other similar UE operations); access or monitor operations of other applications executed by the UE; writing data to the memory of UE; activate another trustlet; or any combination thereof.

Figure 3A:
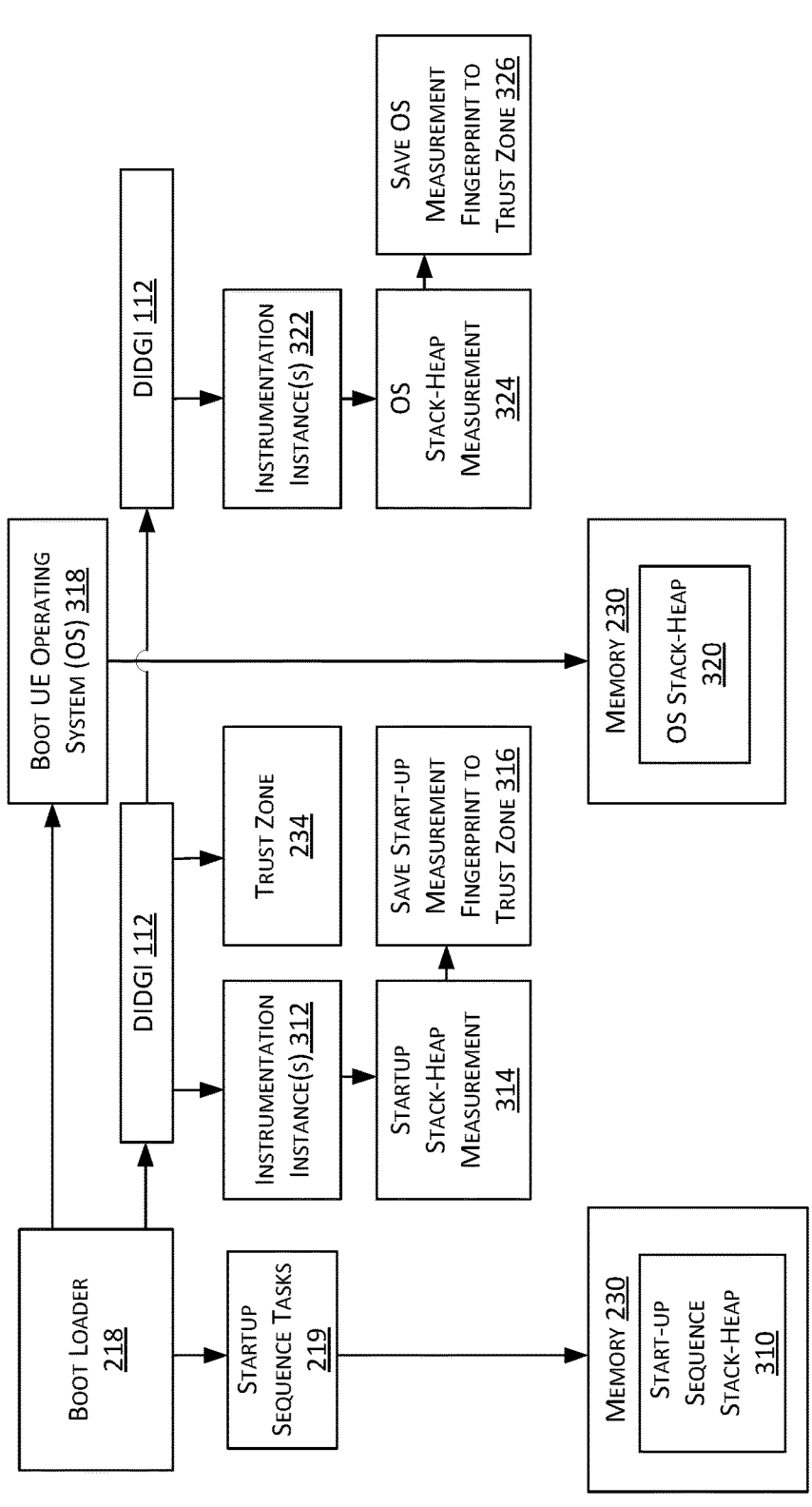
FIGS. 3A and 3B are flow diagrams illustrating the generation of measurement fingerprints using instrumentation instances, in accordance with some embodiments described herein.

Referring now to FIG. 3A, FIG. 3A is a flow diagram illustrating the generation of measurement fingerprint using instrumentation instances, in accordance with some embodiments described herein. As shown in FIG. 3A, upon power up of the UE 110, boot loader 218 executes on the controller 216 (shown in FIG. 2). Upon execution, the boot loader 218 proceed to execute the startup sequence tasks 219 and may further execute the DIDGI 112. As the startup-sequence tasks 219 are executed, they may perform tasks such as memory tests, and/or a check of firmware and/or software checksums (and/or hash codes) to ensure the integrity of such code (e.g., that it is free from corruption and/or tampering) before execution. Examples of tasks that may be included in a startup sequence may include one or more of, but not be limited to, a power-on self-test (POST), accessory component BIOS detection and start-up (e.g., detect and execute a video card BIOS code to initialize video hardware), detecting installed memory and perform memory tests, assigning resources such as DMA channel, and/or identifying a boot device (whether logical or physical) where the device operating system resides. As the startup-sequence tasks 219 are performed, those tasks read, record, and swap various items of data to the UE memory 230 in a portion of memory defined as the start-up sequence stack-heap 310 for those tasks. Execution of the DIDGI 112 may be performed with, or after, execution of the start-up sequence tasks 219. When executed, the DIDGI 112 establishes (executes) one or more instrumentation instances 312 and may also establish trust zone 234 (which in some embodiments may be established in the TEE 226). In some embodiments, the instrumentation instances 312 may be executed within the context of the trust zone 234. For example, an instrumentation instance 312 may comprise a daemon that collects data from an application or the underlying system. The instrumentation instances 312 may perform one or more measurements of the start-up sequence stack-heap 310 (shown at 314) and may save a start-up measurement fingerprint to the trust zone 234 (as shown at 316) for use in producing a set of measurement fingerprints. For example, a measurement fingerprint may be derived from the binary values of memory registers and/or locations of the start-up sequence tasks stack-heap 310. A measurement fingerprint may comprise a sum, hash, or other statistical computation performed using the data stored in the start-up sequence tasks stack-heap 310. In some embodiments, the measurement fingerprint may comprise an imprint from the stack-heap of code used to perform the start-up sequence tasks 219.

In some embodiments, upon successful completion of the start-up sequence tasks 219, the boot loader 218 may boot the UE operating system 220 (shown at 318). As the UE operating system 220 is initiated, its execution also performs tasks, that read, record, and swap various items of data to the UE memory 230 in a portion of memory defined as the stack-heap for those operating system tasks, shown as OS stack-heap 320. The DIDGI 112 may establish one or more instrumentation instances 322 to measure the OS stack-heap 320. In some embodiments, the instrumentation instances 322 may be executed within the context of the trust zone 234. For example, an instrumentation instance 322 may comprise a daemon that collects data from an application or the underlying system. The instrumentation instances 322 may perform one or more measurements of the OS stack-heap 320 (shown at 324) and may save an OS measurement fingerprint to the trust zone 234 (as shown at 326) for use in producing a set of measurement fingerprints. For example, a measurement fingerprint may be derived from the binary values of memory registers and/or locations of the OS stack-heap 320. A measurement fingerprint may comprise a sum, hash, or other statistical computation performed using the data stored in the OS stack-heap 310. In some embodiments, the measurement fingerprint may comprise an imprint from the stack-heap of code used to perform initialize the operating system 220.

Figure 3B:
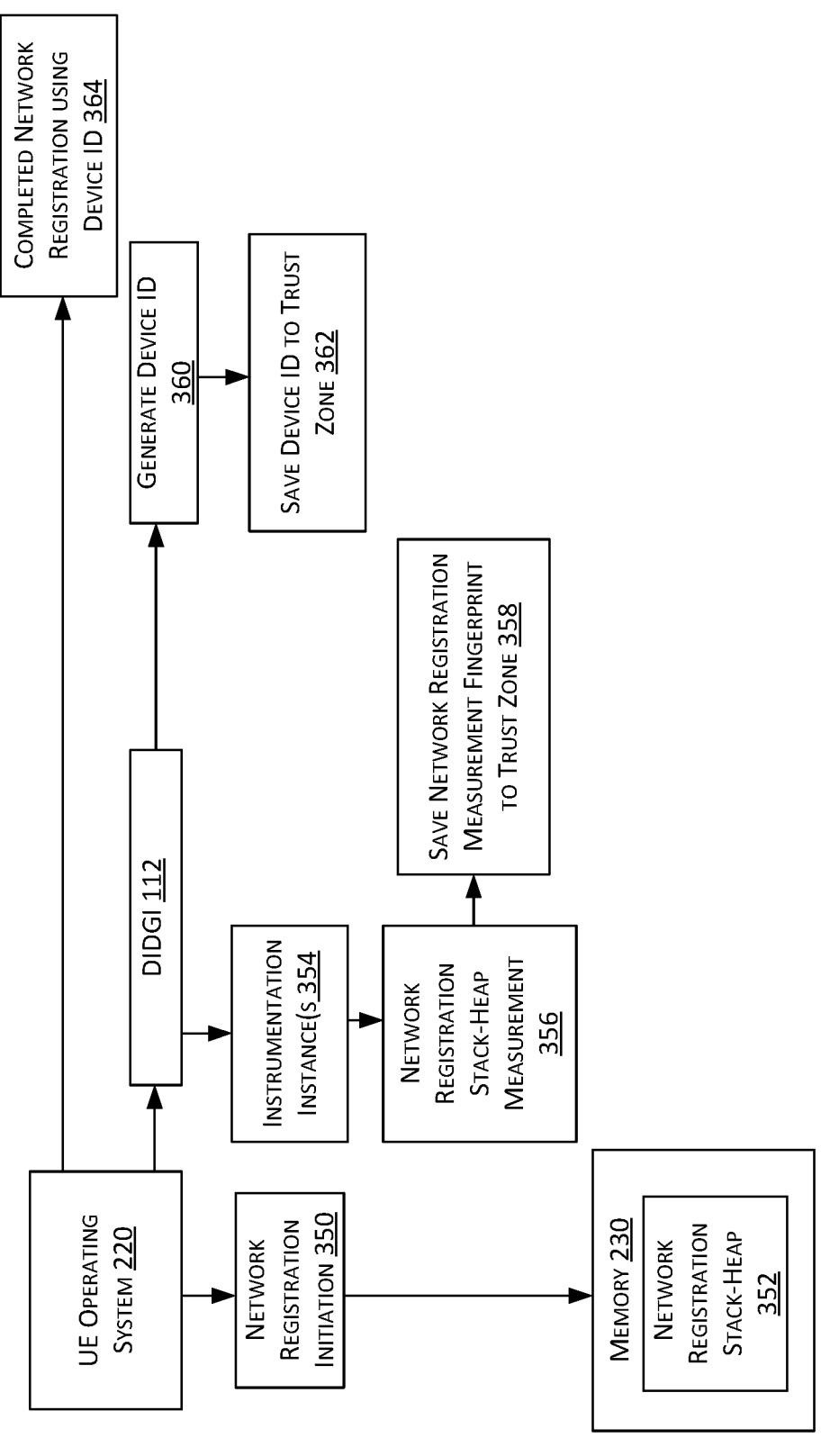

Referring now to FIG. 3B, in some embodiments, other tasks may be serve as a source of measurement fingerprints. For example, as illustrated in FIG. 3B, the process of device network registration (e.g., the primary authentication process performed with the operator network core) may consistently produce artifacts in a memory stack-heap that may be measured by the instrumentation instances of the DIDGI 112. As shown in FIG. 3B, in some embodiments, the operating system 220 may initiate a process for registering (e.g. authenticating) the UE 110 with the operator core network 106 (shown at 350), which may trigger the DIDGI 112 to instantiate instrumentation instances 354. In some embodiments, the instrumentation instances 354 may be executed within the context of the trust zone 234. For example, an instrumentation instance 354 may comprise a daemon that collects data from an application or the underlying system. As code for performing the network registration process is executed, the processes read, record, and swap various items of data to the UE memory 230 in a portion of memory defined as the network registration stack-heap 352 for those tasks. The instrumentation instances 354 may perform one or more measurements of the network registration stack-heap 352 (shown at 356) and may save a network registration measurement fingerprint to the trust zone 234 (as shown at 358) for use in producing a set of measurement fingerprints. For example, a measurement fingerprint may be derived from the binary values of memory registers and/or locations of the network registration stack-heap 352. A measurement fingerprint may comprise a sum, hash, or other statistical computation performed using the data stored in the network registration stack-heap 352. In some embodiments, the measurement fingerprint may comprise an imprint from the stack-heap of code used to perform the network registration.

As further illustrated in FIG. 3B, in some embodiments, the DIDGI 112 may execute the device ID generator 242 to generate the device ID (shown at 360) using the set of measurement fingerprints stored to the trust zone. The resulting device ID may be saved to the trust zone (shown at 362) and used as the UE ID for completing the network registration of the UE with the operator network core 106 (as shown at 364).

Figure 4:
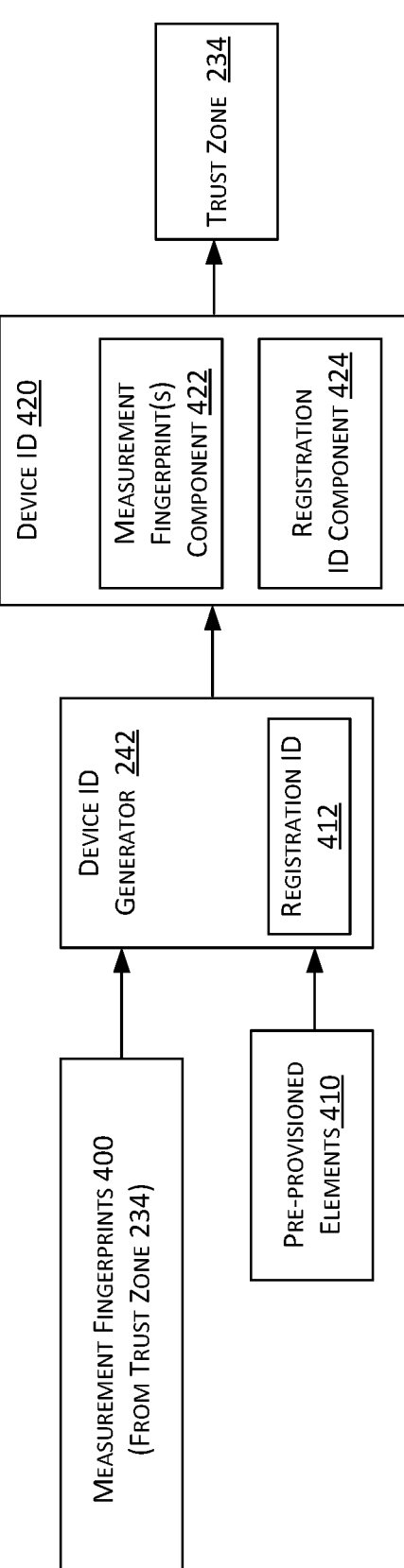
FIG. 4 is a dataflow diagram illustrating device ID generation, in accordance with some embodiments described herein.

Referring now to FIG. 4, FIG. 4 is a dataflow diagram illustrating an example embodiments of device ID generation by the device ID generator 242. In some embodiments, the device ID generator 242 may be triggered to produce a device ID based on a signal and/or function call from the operating system 220 or other process executing on the UE 110. In some embodiments, the device ID generator 242 may be triggered to produce a device ID in response to the UE 110 received a message from the operator core network 106 requesting a device ID for the UE 110, or for which the UE

110 would include a device ID in a reply message as a proper response. Once triggered, the device ID generator 242 may attempt to load a set of measurement fingerprints 400 previously saved to the trust zone 234 by one or more of the instrumentation instances 240. In some embodiments, the device ID generator 242 may be programmed to determine when a complete set of measurement fingerprints 400 have been recorded to, and available from, the trust zone 234. For example, in some embodiments, the set of measurement fingerprints 400 available from the trust zone 234 may be determined to be complete when it includes a set of start-up sequence measurement fingerprints. In some embodiments, the set of measurement fingerprints 400 available from the trust zone 234 may be determined to be complete when it includes a set of start-up sequence measurement fingerprints and a set of OS measurement fingerprints. In some embodiments, the set of measurement fingerprints 400 available from the trust zone 234 may be determined to be complete when it includes a set of start-up sequence measurement fingerprints, a set of OS measurement fingerprints, and a set of network registration measurement fingerprints. In some embodiments, the availability of other combinations of measurement fingerprints may define when the set of measurement fingerprints 400 is complete.

The device ID generator 242 may also attempt to load a set of one or more pre-provisioned elements 410 and compute a registration ID 412 from the pre-provisioned elements 410. For example, a hash algorithm, or other algorithm, may be used by the device ID generator 242 to derive the registration ID using the pre-provisioned elements 410 as an input. The device ID generator 242 may combine the registration ID 412 with the set of measurement fingerprints 400 to form a device ID 420 that is provided to the network as the UE ID for the UE 110. As shown in FIG. 4, the device ID 420 generated by the DIDGI 112 may include a measurement fingerprint component 422 and a registration ID component 424. Although FIG. 4 illustrates the measurement fingerprint component 422 and registration ID component 424 as distinct elements, in some embodiments, the device ID generator 242 may encode the measurement fingerprint component 422 and registration ID component 424 into the device ID 420 as an integrated identifier (such as a hash, for example) from which the measurement fingerprint component 422 and registration ID component 424 may be individually extracted and recovered by the DIDVF 160 (or other function) of the operator network core 106. In some embodiments, the DIDGI 112 may store the generated device ID 420 to the trust zone 234 from where it may be read by the operating system 220 and/or other UE 110 process and used to identify the UE 110 to the operator network core 106. In some embodiments, the DIDGI 112 may directly communicate the device ID 420 to the operating system 220 and/or other UE 110 process.

Figure 5:
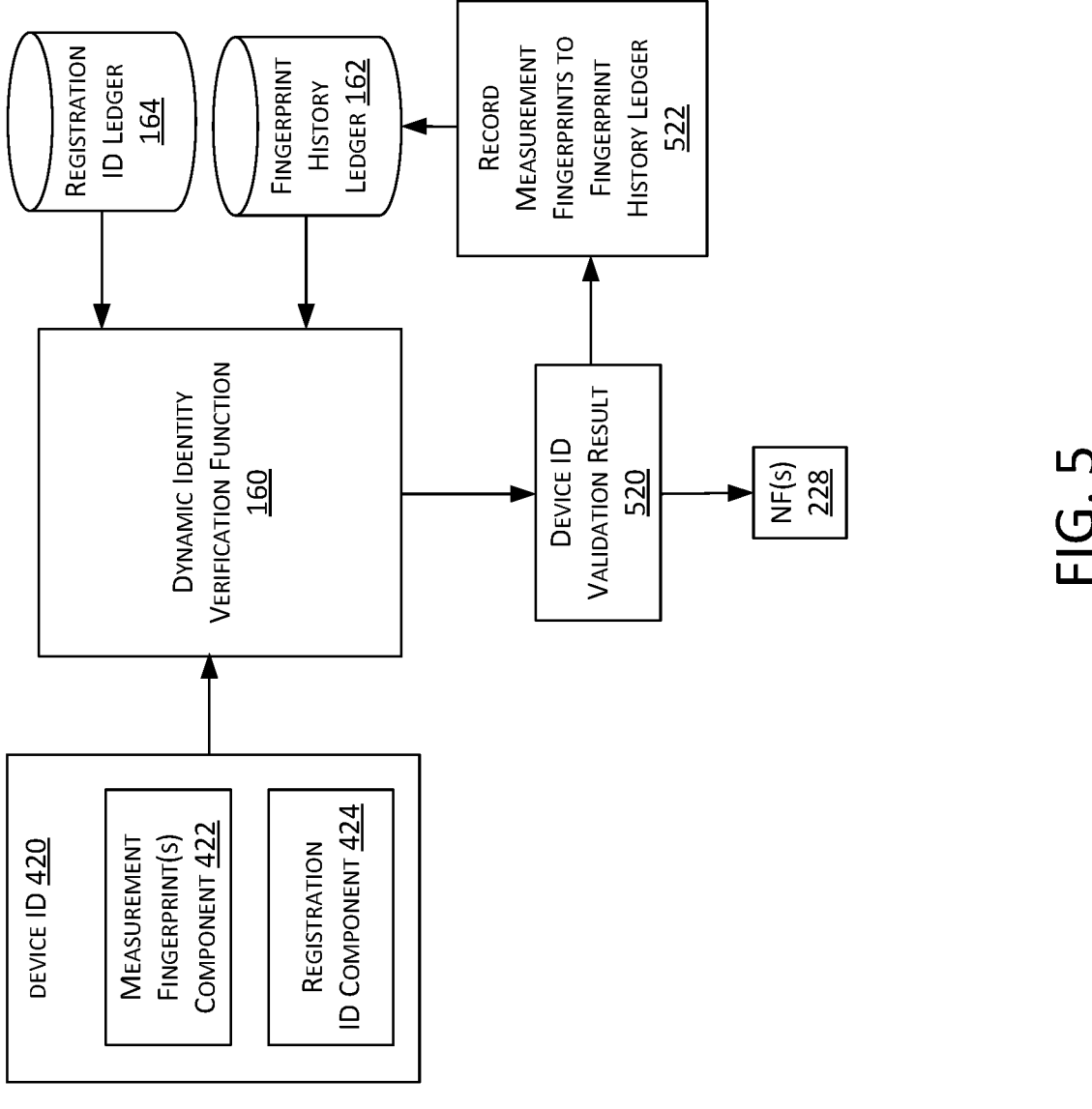
FIG. 5 is a dataflow diagram illustrating dynamic device ID verification, in accordance with some embodiments described herein.

Referring now to FIG. 5, FIG. 5 is a dataflow diagram illustrating and example of dynamic device ID verification by the DIDVF 160 of the operator network core 106. As shown in FIG. 5, in some embodiments, the DIDVF 160 of the operator core network 106 receives the DIDGI 112 generated device ID 420 provided from a UE 110 (e.g., as part of a UE 110 network registration request). To validate the device ID 420, the DIDVF 160 may proceed to extract the registration ID component 424 from the device ID 420 and performs a lookup in the registration ID ledger 164 of the registration ID 412 included in the registration ID component 424. In some embodiments, the registration ID ledger 164 may comprise a blockchain based ledger such as a distributed ledger technology (DLT) ledger, for example.

The registration ID ledger 164 may comprise a ledger of registration IDs provided by one or more device manufacturers, or other sources, for individual devices designed to operate based on using network services accessed from the telecommunications network of network environment 100. In other words, for a UE 110 designed to access the network environment 100, the registration ID ledger 164 should have an independently pre-provisioned record comprising a registration ID corresponding to the registration ID 412 separately derived at the DIDGI 112. In some embodiments, registration IDs pre-recorded to the registration ID ledger 164 may be computed using the same set of pre-provisioned elements that the corresponding individual DIDGI 112 uses to compute the registration ID 412. In other words, for each bona fide UE 110 seeking network access, the registration ID ledger 164 is expected to comprise a pre-computed registration ID that uniquely corresponds to the registration ID 412 computed by the device ID generator 242 executed on the UE 110.

In response to confirming the existence of a registration ID in the registration ID ledger 164 matching the registration ID extracted from the device ID 420, the DIDVF 160 may cross reference the registration ID 412 with the fingerprint history ledger 162 to retrieve one or more sets of measurement fingerprints previously associated with that registration ID 412. In some embodiments, the DIDVF 160 may extract the set of measurement fingerprints 400 from the measurement fingerprints component 422 of the device ID 420 and use the registration ID 412 to retrieve from the fingerprint history ledger 162 the one or more previously recorded sets of measurement fingerprints. If the measurement fingerprints 400 included in the device ID 420 match those previously stored to the fingerprint history ledger 162 (within a matching acceptance criteria) then the DIDVF 160 may generate and output a device ID validation result 520 indicating that the device ID 420 is valid, and the various network functions of the operator core network 106 may accept device ID 420 for the UE 110 as a valid UE ID, and/or proceed with network registration of the UE 110.

In some embodiments, the DIDVF 160 may execute one or more matching algorithms to determine if the measurement fingerprints 400 from the device ID 420 are consistent with previous sets of historical measurement fingerprints for that UE 110 (e.g., corresponding to registration ID 412) recorded to the fingerprint history ledger 162. For example, the DIDVF 160 may use an original set of measurement fingerprints obtained for the UE 110 (either from the first time the UE accessed the network or from a manufacturer provided initial set of measurement fingerprints) and/or one or more of the most recently received set of measurement fingerprints from that UE 110. That is, the fingerprint history ledger 162 may include, for example, a first set of measurement fingerprints obtained during UE 110 fabrication (e.g., from factory calibration or testing) and previously recorded to fingerprint history ledger 162, and/or subsequent measurement fingerprints that were recorded to fingerprint history ledger 162 provided by the UE 110 during previous network sessions. In some embodiments, the DIDVF 160 need not determine that an exact match exists between the current measurement fingerprints and prior measurement fingerprints to accept the device ID 420. For example, the DIDVF 160 may compute a vector from the current set of measurement fingerprints 400 and a vector from sets of measurement fingerprints previously recorded to fingerprint history ledger 162, and compare a computed vector distance or gradient to an acceptance threshold to determine when to accept or reject the device ID 420. For example, a slight shift in the location of a previously recognized binary sequence or pattern in a stack-heap 232 may be a result of a the UE 110 blocking usage of a recently detected corrupt memory location in the memory 230, or due to unreleased memory in the stack-heap 232 caused by an unrelated misbehaving application or other process. In some embodiments, when the computed deviation is within the acceptance criterial then the device ID validation result 520 may indicate that the device ID 420 offered by the UE 110 is accepted. One or more network functions 128 of the operator network core 106 may receive the device ID validation result 520 and proceed to use the device ID 420 in conjunction with initiating and/or providing network services to the UE 110. In some embodiments, when the device ID validation result 520 indicates that the device ID 420 is valid, the DIDVF 160 may record the set of measurement fingerprints 400 from the measurement fingerprint component 422 to the fingerprint history ledger 162 (as shown at 522) for use in the future as a set of historical measurement fingerprints associated with UE 110's registration ID 412. If the computed deviation is in excess of the acceptance criteria, then the device ID validation result 520 may indicate that the device ID 420 is not accepted and registration of UE 110 on the network is rejected.

Figure 6:
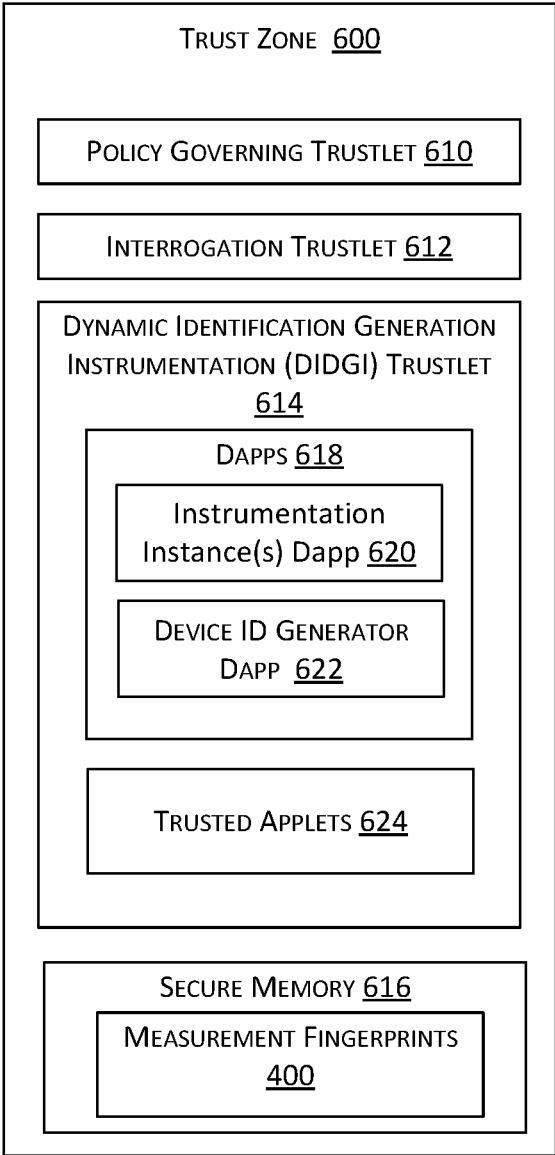
FIG. 6 is a diagram illustrating a trust zone or trusted execution environment, in accordance with some embodiments described herein.

Referring now to FIG. 6, FIG. 6 illustrates a trust zone 600 such as trust zone 234 and/or TEE 226. As depicted, trust zone 600 illustratively may include a policy governing trustlet 610, an interrogation trustlet 612, a DIDGI trustlet 614 and/or a secure memory 616 for recording measurement fingerprints 400. In other embodiments, trust zone 600 may include a fewer or greater number of trustlets.

Policy governing trustlet 610 corresponds to an illustrative example of computer readable code that is activated in response to execution of an application or operation. Upon activation, policy governing trustlet 610 may access a locally stored set of keys corresponding to the application and the UE's and/or network device's processor. Such keys may be utilized for establishing a secured communication link between the UE 110 and services provided by servers 156 of data network 107, operator core network 106, and/or other secured transactions. Additionally, policy governing trustlet 610 may access a UE's and/or network device's unique device identifier (device ID), such as the device ID 420 generated by the DIDGI 112. The policy governing trustlet 610 may communicate the accessed data to a communication network for analysis.

Interrogation trustlet 612 corresponds to an illustrative example of computer readable code that is activated in response to a command from the communication network. An interrogation trustlet can be activated by a command that is generated in response to a determination that UE 110 is an unknown device or that the UE provided anomalous data for a requested network service. In response to activation, an interrogation trustlet 612 may activate other trustlets, access additional data, or perform any other trustlet operation. The interrogation trustlet 612 may communicate the accessed data to a network function of the operator core network 106. For example, interrogation trustlet 612 can be activated in response to a command that a network function 228 or server application from a server 156 on data network 107 has requested data from one or more trustlets executed in the trust zone 600. In some embodiments, one or more of the DIDGI trustlet 614 are activated by the interrogation trustlet 612 in response to a command from a server application and/or based on instructions received by communicating with the operator network core 106.

The DIDGI trustlet 614 corresponds to an illustrative example of computer readable code that may be activated in conjunction with the DIDGI 112. As such, the DIDGI trustlet 614 may define a component of the DIDGI 112. DIDGI trustlet 614 may include one or more decentralized applications 618, also known as Dapps. Dapps 618 typically operate on a blockchain or network of peer-to-peer computers. In some embodiments, Dapps 618 comprise applications that may engage directly with a blockchain ledger for determining pre-provisioned elements 410 used to generate the registration ID 412. The DIDGI trustlet 614 may include an instrumentation instance Dapp 620 that functions to securely record measurement fingerprints obtained by the instrumentation instances to the secure memory 616. The DIDGI trustlet 614 may include a device ID generator Dapp 622 that functions to securely record a device ID produced by the device ID generator 242 to the secure memory 616 and/or communicate the device ID to a network function of the operator core network 106.

A distributed application, such as Dapps 618, may comprise a top-tier definition for an application programmable interface (API) that is coded specifically to control a blockchain or distributed ledger instance and, in some implementations, are embedded directly into the blocks themselves (to form what is referred to as a smart contract (SC)). When a distributed application, such as Dapps 618, is implemented using one or more smart contracts, there can be as many stipulations as needed programmed into the smart contract to satisfy the participants (i.e., the wireless network provider and/or the UE owner/operator) that the data is gathered and recorded with integrity. Such a smart contract utilizes "if/when . . . then . . . " rules that govern the data indicators and to explore possible exceptions that might affect the fidelity of the collected data and its viability as trusted data. In some implementations, exceptions are delegated to a reference chain that contains variations of programming that differ from the priority smart contract program. In some embodiments, a data share location where the measurement fingerprints 400 and/or device ID 420 can be securely stored may be defined by the DIDGI trustlet 614 and/or other trustlet.

Generally, the Dapps 618 may be placed behind a hardware Root of Trust (e.g., within the TEE 226), providing for total attestation of the measurement fingerprints 400 and/or device ID 420 generated by the DIDGI 112. The wireless network operator (e.g., the service carrier) may hold the certificates of authority that created any associated secure area (e.g., trust zone 234, 600) and those certificates may be stored in a protected space. If the UE 110 does not support a TEE 226 or other hardware root of trust mechanism, then the Dapps 614 may instead be implemented in the rich environment (RE) of the UE 110 and utilize a software trust mechanism to generate the trust zone 234. In some embodiments, other trusted applets 624 may also be executed to perform one or more secure operations to implement functions of the DIDGI 112 either instead or, or in conjunction with, the Dapps 618.

FIG. 7 is a flow chart illustrating a method 700 for dynamic identification generation for telecommunications network user equipment, according to some embodiments. It should be understood that the features and elements described herein with respect to the method of FIG. 7 may be used in conjunction with, in combination with, or substituted for elements of, any of the other embodiments discussed herein and vice versa. Further, it should be understood that the functions, structures, and other descriptions of elements for embodiments described in FIG. 7 may apply to like or similarly named or described elements across any of the figured and/or embodiments described herein and vice versa. In some embodiments, elements of method 700 are implemented utilizing one or more processing units of a UE 110, as disclosed in any of the embodiments herein.

The method 700 at 710 includes generating a set of measurement fingerprints for a user equipment (UE) based on one or more measurements of device memory states corresponding to a predefined set of one or more tasks executed by the UE. As previously discussed, dynamic identification generation instrumentation executed by the UE, such as DIDGI 112 may execute one or more instrumentation instances to measure the state of UE memory, such as stack-heap memory used by bootloader startup sequence tasks and/or operating system initialization tasks (and/or other tasks such as network registration tasks) to generate a set of measurement fingerprints. In some embodiments, the set of measurement fingerprints are derived by applying a hash function, or similar function, to the measurements obtained by the instrumentation instances. A measurement fingerprint may comprise a sum, hash, or other statistical computation performed using the data stored in the stack-heap and/or may comprise an imprint from the stack-heap of code used to perform the one or more tasks.

The method 700 at 712 includes generating a registration ID for the UE based on a set of one or more pre-provisioned elements associated with the UE. DIDGI 112 may include a device ID generator that reads the one or more pre-provisioned elements and computed the registration ID from the one or more pre-provisioned elements. In some embodiments, the registration ID is computed by applying a hash function, statistical computation, or similar function, to the set of one or more pre-provisioned elements. The set of pre-provisioned elements may include hardware identifiers and/or shared keys, and/or other identifiers or elements as discussed herein. The pre-provisioned identifiers may be processed to define a registration ID associated with the individual UE.

The method 700 at 714 includes generating a device ID as a function of the set of measurement fingerprints and the registration ID. For example, the DIDGI 112 may execute a device ID generator functions to derive a unique device ID for an individual UE 110 as a function of the set of measurement fingerprints and one or more pre-provisioned identifiers (which may include hardware identifiers and/or shared keys, and/or other identifiers as discussed below). In some embodiments, the pre-provisioned identifiers are processed to define a registration ID associated with the individual UE 110, and the registration ID combined with the set of measurement fingerprints to form the device ID.

The method 700 at 716 includes transmitting a message comprising the device ID to a network function of a network to request access to at least one service provided via the network. For example, in some embodiments, a UE 110 may communicate an authorization request to the operator core network (via the access network 104 or RAN 102) that includes the DIDGI generated device ID. The authorization request may be processed by the AMF 130 and/or AUSF 134, which refer the device ID to the DIDVF 160 for validation. In some embodiments, to validate the device ID, a registration ID component of the device ID may be cross-referenced by the network function with the registration ID ledger 164, and the set of measurement fingerprints of the device ID cross-referenced by the network function with prior measurement fingerprints from the UE 110 from the fingerprint history ledger 162, as further discussed below with respect to FIG. 8.

FIG. 8 is a flow chart illustrating a method 800 for validating a device ID for a UE, according to some embodiments. It should be understood that the features and elements described herein with respect to the method of FIG. 8 may be used in conjunction with, in combination with, or substituted for elements of, any of the other embodiments discussed herein and vice versa. Further, it should be understood that the functions, structures, and other descriptions of elements for embodiments described in FIG. 8 may apply to like or similarly named or described elements across any of the figured and/or embodiments described herein and vice versa. In some embodiments, elements of method 800 are implemented utilizing a network function of an operator network core, such as the dynamic identity verification function 160 as disclosed in any of the embodiments herein.

The method 800 at 810 includes receiving a device identifier (ID) from the UE. The device ID may comprise a first component that includes a set of measurement fingerprints derived from one or more measurements of device memory states corresponding to a predefined set of one or more tasks executed by the UE. The device ID may further comprise a second component that includes a registration ID derived from a set of one or more pre-provisioned elements associated with the UE.

The method 800 at 812 includes determining a validity of the device ID based on cross-referencing the registration ID with a registration ID ledger, and cross-referencing the set of measurement fingerprints with a fingerprint history ledger. In some embodiments, at least one of the fingerprint history ledger or the registration ID ledger comprises at least one of a distributed ledger technology (DLT), a Hyperledger technology, or a blockchain technology. As discussed herein, and particularly with respect to FIG. 5, determining the validity of the device ID may be performed by determining if the registration ID ledger comprises a registration ID record corresponding to the registration ID of the device ID. When the registration ID ledger does comprise a registration ID record corresponding to the registration ID of the device ID, the dynamic identity verification function may retrieve from the fingerprint history ledger one or more historical sets of measurement fingerprints previously associate with the registration ID, and determine a similarity between the one or more historical sets of measurement fingerprints and the set of measurement fingerprints from the device ID.

For example, the DIDVF may execute one or more matching algorithms to determine if the set of measurement fingerprints received from the device ID are similar to previous sets of historical measurement fingerprints recorded to the fingerprint history ledger. In some embodiments, the method may include computing a first vector from the current set of measurement fingerprints from the device ID, and a second vector from sets of measurement fingerprints previously recorded to fingerprint history ledger, and compare a computed vector distance, gradient, and/or other metric, to an acceptance criteria (such as a distance or similarity acceptance threshold) to determine when to accept or reject the device ID.

The method 800 at 814 includes outputting a device ID validation result based on the validity of the device ID. In some embodiments, the device ID validation output may indicate a validation of the device ID when the similarity satisfies the acceptance criteria, and indicate a rejection of the device ID when the similarity does not satisfy the acceptance criteria. Based on the device ID validation result, one or more network functions of the operator core network may accept device ID for the UE as a valid UE ID, and/or proceed with network registration of the UE.

Figure 9:
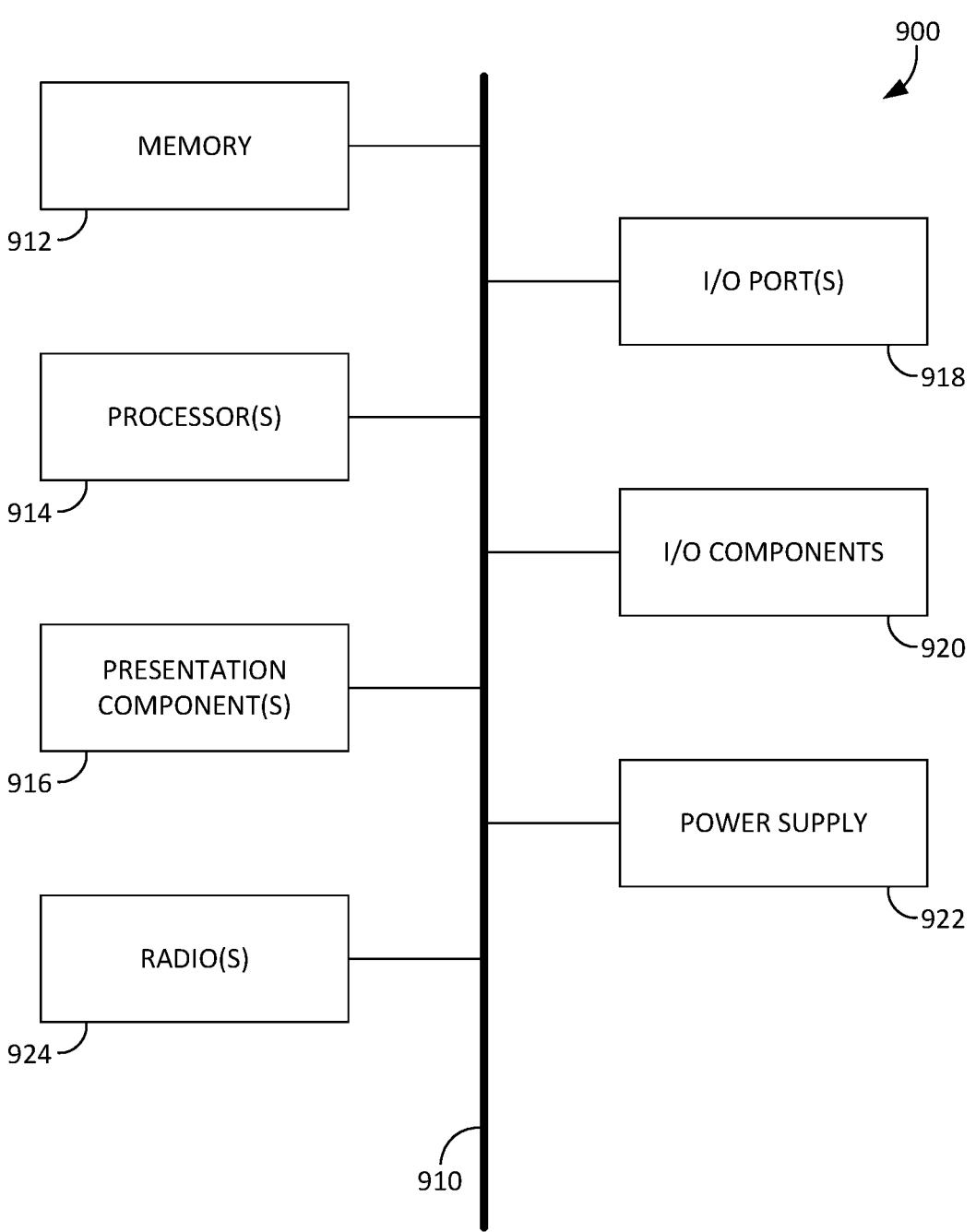
FIG. 9 is an example computing device, in accordance with some embodiments described herein.

Referring to FIG. 9, a diagram is depicted of an exemplary computing environment suitable for use in implementations of the present disclosure. In particular, the exemplary computer environment is shown and designated generally as computing device 900. Computing device 900 is but one example of a suitable computing environment and is not intended to suggest any limitation as to the scope of use or functionality of the embodiments described herein. Neither should computing device 900 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 9, computing device 900 includes bus 910 that directly or indirectly couples the following devices: memory 912, one or more processors 914, one or more presentation components 916, input/output (I/O) ports 918, I/O components 920, power supply 922, and radio 924. Bus 910 represents what may be one or more busses (such as an address bus, data bus, or combination thereof). The devices of FIG. 9 are shown with lines for the sake of clarity. However, it should be understood that the functions performed by one or more components of the computing device 900 may be combined or distributed amongst the various components. For example, a presentation component such as a display device may be one of I/O components 920. In some embodiments, the UE 110 may comprise a computing device 900. The processors of computing device 900, such as one or more processors 914, have memory. The present disclosure hereof recognizes that such is the nature of the art, and reiterates that FIG. 9 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 9 and refer to "computer" or "computing device." In some embodiments, the DIDGI 112, or other components of the UE 110, or other components as described in any of the examples of this disclosure, may be implemented at least in part by code executed by the one or more processors(s) 914. The trust zone 234 may be implemented at least in part using memory 912.

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media and computer-readable media do not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer-storage media in the form of volatile and/or nonvolatile memory. Memory 912 may be removable, non-removable, or a combination thereof. Exemplary memory includes solid-state memory, hard drives, optical-disc drives, etc. Computing device 900 includes one or more processors 914 that read data from various entities such as bus 910, memory 912 or I/O components 920. One or more presentation components 916 presents data indications to a person or other device. Exemplary one or more presentation components 916 include a display device, speaker, printing component, vibrating component, etc. I/O ports 918 allow computing device 900 to be logically coupled to other devices including I/O components 920, some of which may be built in computing device 900. Illustrative I/O components 920 include a microphone, joystick, game pad, satellite dish, scanner, printer, wireless device, etc.

Radio(s) 924 represents a radio that facilitates communication with a wireless telecommunications network. For example, radio(s) 924 may be used to establish communications with components of the RAN 102, access network 104, operator core network 106 and/or core network edge 105. Illustrative wireless telecommunications technologies include CDMA, GPRS, TDMA, GSM, and the like. In some embodiments, the radio(s) 924 comprise circuits that implement the radio module 210 of a UE 110 as described herein. Radio(s) 924 may additionally or alternatively facilitate other types of wireless communications including Wi-Fi, WiMAX, LTE, and/or other VoIP communications. In some embodiments, radio(s) 924 may support multi-modal connections that include a combination of 3GPP radio technologies (e.g., 4G, 5G and/or 6G) and/or non-3GPP radio technologies. As can be appreciated, in various embodiments, radio(s) 924 can be configured to support multiple technologies and/or multiple radios can be utilized to support multiple technologies. In some embodiments, the radio(s) 924 may support communicating with access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Referring to FIG. 10, a diagram is depicted generally at 1000 of an exemplary cloud computing environment 1010 for implementing one or more aspects of a dynamic identification generation instrumentation 112 and/or a dynamic identity verification function 160, implemented by the systems and methods described herein. Cloud computing environment 1010 is but one example of a suitable cloud-computing environment and is not intended to suggest any limitation as to the scope of use or functionality of the embodiments presented herein. Neither should cloud-computing environment 1010 be interpreted as having any dependency or requirement relating to any one or combination of components illustrated. In some embodiments, the cloud-computing environment 1010 is executed within operator core network 106, the core network edge 105, or otherwise coupled to the core network edge 105 or operator core network 106.

Cloud computing environment 1010 includes one or more controllers 1020 comprising one or more processors and memory. The controllers 1020 may comprise servers of a data center. In some embodiments, the controllers 1020 are programmed to execute code to implement at least one or more aspects of the dynamic identification generation instrumentation 112 and/or a dynamic identity verification function 160. For example, in one embodiment the dynamic identity verification function 160 may be implemented as one or more virtual network functions (VNFs)/container network functions (CNFs) 1030 running on a worker node cluster 1025 established by the controllers 1020. In some embodiments, dynamic identification generation instrumentation 112 may obtain one or more of the pre-provisioned elements for the UE 110 from the VNFs 1030.

The cluster of worker nodes 1025 may include one or more orchestrated Kubernetes (K8s) pods that realize one or more containerized applications 1035 for dynamic identity verification function 160. In other embodiments, another orchestration system may be used to realize the dynamic identity verification function 160. For example the worker nodes 1025 may use lightweight Kubernetes (K3s) pods, Docker Swarm instances, and/or other orchestration tools. In some embodiments, the UE 110 may be coupled to the controllers 1020 of the cloud-computing environment 1010 by access network 104 and/or core network edge 105. In some embodiments, fingerprint history ledger 162 and/or the registration ID ledger 164 may be implemented at least in part as one or more data store persistent volumes 1040 in the cloud-computing environment 1010.

In various alternative embodiments, system and/or device elements, method steps, or example implementations described throughout this disclosure (such as the UE, access networks, core network edge, operator core network, dynamic identification generation instrumentation, dynamic identity verification function, and/or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Verilog or Very High Speed Integrated Circuit (VHSIC) Hardware Description Language (VHDL).

As used herein, the terms "function", "unit", "server", "node" and "module" are used to describe computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for identifying user equipment (UE) on a network, the system comprising:
   one or more processors; and
   one or more computer-readable media storing computer-usable instructions that, when executed by the one or more processors, cause the one or more processors to:
   generate a set of measurement fingerprints for a UE representing one or more snapshots of one or more measurements of device memory states, the device memory states produced by execution of a predefined set of one or more UE start-up sequence tasks or UE operating system initialization tasks executed by the UE;
   generate a registration identifier (ID) for the UE based on a set of one or more pre-provisioned elements associated with the UE;
   generate a device ID as a function of the set of measurement fingerprints and the registration ID;

determine a validity of the device ID based on cross-referencing the registration ID with a registration ID ledger, and cross-referencing the set of measurement fingerprints with a fingerprint history ledger; and transmit a message comprising the device ID to a network function of a network to request access to at least one service provided via the network based on the validity of the device ID.

2. The system of claim 1, the one or more processors further configured to:

execute at least one instrumentation instance, wherein the at least one instrumentation instance measures the device memory states corresponding to the predefined set of one or more tasks executed by the UE.

3. The system of claim 2, wherein the at least one instrumentation instance measures a stack-heap memory accessed by one or more startup sequence tasks executed by a bootloader of the UE to at least in part generate the set of measurement fingerprints.

4. The system of claim 2, wherein the at least one instrumentation instance measures a stack-heap memory used during initialization of an operating system to at least in part generate the set of measurement fingerprints.

5. The system of claim 2, wherein the at least one instrumentation instance measures a stack-heap memory used during executing of a network registration process to at least in part generate the set of measurement fingerprints.

6. The system of claim 1, wherein the set of one or more pre-provisioned elements comprise at least one of:

a hardware identifier;

a shared key;

a serial number;

an identifier embedded within the UE;

an identifier embedded within a subscriber identity module (SIM) or eSIM;

a decentralized identifier (DID); and an identifier generated using a blockchain technology.

7. The system of claim 1, wherein the one or more processors compute the registration ID by applying a function to the set of one or more pre-provisioned elements, wherein the function comprises at least one of a statistical computation or a hash algorithm.

8. The system of claim 1, wherein the one or more processors compute the set of measurement fingerprints by applying a function to the one or more measurements of device memory states, wherein the function comprises at least one of a statistical computation or a hash algorithm.

9. The system of claim 1, the one or more processors further to:

store to a trust zone in a memory of the UE at least one of:

the set of measurement fingerprints; and the device ID.

10. The system of claim 1, the one or more processors further to:

execute a trustlet in a trusted environment of UE to generate at least one of:

the set of measurement fingerprints;

the registration ID; and the device ID.

11. The system of claim 1, the one or more processors further to:

encode the set of measurement fingerprints and the registration ID into the device ID as an integrated identifier from which the set of measurement fingerprints and the registration ID are extractable by the network function.

12. A method for identifying user equipment (UE) on a network, the method comprising:

generating a set of measurement fingerprints for a UE representing one or more snapshots of one or more measurements of device memory states, the device memory states produced by execution of a predefined set of one or more UE startup sequence tasks or UE operating system initialization tasks executed by the UE;

generating a registration ID for the UE based on a set of one or more pre-provisioned elements associated with the UE;

generating a device ID as a function of the set of measurement fingerprints and the registration ID, the device ID comprising a first component that includes the set of measurement fingerprints and a second component that includes the registration ID;

determining a validity of the device ID based on cross-referencing the registration ID with a registration ID ledger, and cross-referencing the set of measurement fingerprints with a fingerprint history ledger; and transmitting a message comprising the device ID to a network function of a network to request access to at least one service provided via the network based on the validity of the device ID.

13. The method of claim 12, the method further comprising:

executing at least one instrumentation instance; and measuring the device memory states corresponding to the predefined set of one or more tasks executed by the UE using the at least one instrumentation instance to generate the set of measurement fingerprints.

14. The method of claim 12, the method further comprising:

executing one or more startup sequence tasks; and measuring a stack-heap memory accessed by the one or more startup sequence tasks to generate, at least in part, the set of measurement fingerprints.

15. The method of claim 12, the method further comprising:

initializing an operating system; and measuring a stack-heap memory accessed by initializing the operating system to generate, at least in part, the set of measurement fingerprints.

16. The method of claim 12, the method further comprising:

executing a network registration process for registering the UE with the network; and measuring a stack-heap memory accessed by the network registration process to generate, at least in part, the set of measurement fingerprints.

17. The method of claim 12, the method further comprising:

encoding the device ID as an integrated identifier from which the set of measurement fingerprints and the registration ID are extractable by the network function.

18. A telecommunications network, the network comprising:

a network operator core, wherein a user equipment (UE) communicates with the network operator core through an access network; and one or more processing units to:

receive a device identifier (ID) from the UE, the device ID comprising a first component that includes a set of measurement fingerprints derived from one or more snapshots of one or more measurements of device memory states, the device memory states produced by execution of a predefined set of one or more UE startup sequence tasks or UE operating system initialization tasks executed by the UE, and a second component that includes a registration ID derived from a set of one or more pre-provisioned elements associated with the UE;

determine a validity of the device ID based on cross-referencing the registration ID with a registration ID ledger, and cross-referencing the set of measurement fingerprints with a fingerprint history ledger; and output a device ID validation result based on the validity of the device ID.

19. The network of claim 18, wherein the at least one of the fingerprint history ledger or the registration ID ledger comprises at least one of a distributed ledger technology (DLT), a Hyperledger technology, or a blockchain technology.

20. The network of claim 18, the one or more processing units configured to:

determine if the registration ID ledger comprises a registration ID record corresponding to the registration ID of the device ID;

in response to determining that the registration ID ledger does comprises the registration ID record corresponding to the registration ID of the device ID, retrieve from the fingerprint history ledger one or more historical sets of measurement fingerprints previously associated with the registration ID;

determine a similarity between the one or more historical sets of measurement fingerprints and the set of measurement fingerprints from the device ID; and wherein the device ID validation result is generated to indicate a validation of the device ID when the similarity satisfies an acceptance criteria, and the device ID validation result is generated to indicate a rejection of the device ID when the similarity does not satisfy the acceptance criteria.

\* \* \* \* \*